US011655775B1

(12) United States Patent
Puente et al.

(10) Patent No.: US 11,655,775 B1
(45) Date of Patent: May 23, 2023

(54) COMBUSTION CONTROL USING SPIKING NEURAL NETWORKS

(71) Applicant: UT-Battelle, LLC, Oak Ridge, TN (US)

(72) Inventors: Bryan P. Maldonado Puente, Oak Ridge, TN (US); Brian C. Kaul, Oak Ridge, TN (US); Catherine D. Schuman, Oak Ridge, TN (US); John Parker Mitchell, Oak Ridge, TN (US); Steven R. Young, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/888,047

(22) Filed: Aug. 15, 2022

Related U.S. Application Data

(60) Provisional application No. 63/235,241, filed on Aug. 20, 2021.

(51) Int. Cl.
  *F02D 41/24* (2006.01)
  *G06N 3/049* (2023.01)
  (Continued)

(52) U.S. Cl.
  CPC ..... *F02D 41/2438* (2013.01); *F02D 41/0002* (2013.01); *F02D 41/0047* (2013.01);
  (Continued)

(58) Field of Classification Search
  CPC ............ F02D 41/2438; F02D 41/0002; F02D 41/0047; F02D 41/022; F02D 41/38;
  (Continued)

(56) References Cited

U.S. PATENT DOCUMENTS

| 5,781,700 A * | 7/1998 | Puskorius ........... F02D 41/2432 706/14 |
| 5,915,368 A * | 6/1999 | Ishida ..................... F02D 41/22 123/682 |

(Continued)

OTHER PUBLICATIONS

Anderson, Hyrum S., et al. "Evading Machine Learning Malware Detection." Black Hat (2017).

(Continued)

*Primary Examiner* — Carl C Staubach
(74) *Attorney, Agent, or Firm* — Lempia Summerfield Katz LLC

(57) ABSTRACT

A system that controls a combustion engine stores network vectors in a memory that represent diverse and distinct spiking neural networks. The system decodes the network vectors and trains and evaluates the spiking neural networks. The system duplicates selected network vectors and crosses-over the duplicated network vectors that represent modified spiking neural networks. The system mutates the crossed-over duplicated network vectors by randomly modifying one or more portions of the crossing-over duplicated network vectors. The system meter exhaust gas into an intake manifold when an engine temperature exceeds a threshold, an engine load exceeds a threshold, an engine's rotation-per-minute rate exceeds a threshold, and a fuel flow exceeds a threshold. The system modifies fuel flow into an engine's combustion chamber on a cycle-to-cycle basis by the trained spiking neural network.

19 Claims, 19 Drawing Sheets
(15 of 19 Drawing Sheet(s) Filed in Color)

(51) Int. Cl.
| | |
|---|---|
| *G06N 3/08* | (2023.01) |
| *F02D 41/00* | (2006.01) |
| *F02D 41/38* | (2006.01) |
| *F02P 5/15* | (2006.01) |
| *F02D 41/02* | (2006.01) |

(52) U.S. Cl.
CPC .......... *F02D 41/022* (2013.01); *F02D 41/38* (2013.01); *F02P 5/1502* (2013.01); *G06N 3/049* (2013.01); *G06N 3/08* (2013.01); *F02D 2200/021* (2013.01); *F02D 2200/04* (2013.01); *F02D 2200/0614* (2013.01); *F02D 2200/101* (2013.01); *F02D 2200/501* (2013.01)

(58) Field of Classification Search
CPC .......... F02D 2200/021; F02D 2200/04; F02D 2200/0614; F02D 2200/101; F02D 2200/501; F02P 5/1502; G06N 3/049; G06N 3/08
See application file for complete search history.

(56) References Cited

U.S. PATENT DOCUMENTS

| | | | | |
|---|---|---|---|---|
| 11,125,202 | B1* | 9/2021 | Xu | G06N 5/01 |
| 11,149,677 | B1* | 10/2021 | Charbonnel | F02D 13/0223 |
| 11,326,572 | B2* | 5/2022 | Do | F02D 13/0207 |
| 11,459,962 | B2* | 10/2022 | Sudarsan | F02D 41/248 |
| 2004/0084024 | A1* | 5/2004 | Malaczynski | G01L 23/22 |
| | | | | 73/35.08 |
| 2011/0214650 | A1* | 9/2011 | Wang | F02D 41/1405 |
| | | | | 123/703 |
| 2015/0026110 | A1* | 1/2015 | Srinivasa | G06N 3/08 |
| | | | | 706/25 |
| 2020/0063681 | A1* | 2/2020 | Neema | F02D 41/2454 |
| 2020/0378330 | A1* | 12/2020 | Muto | F02M 26/13 |
| 2021/0003088 | A1* | 1/2021 | Chen | F02B 5/02 |
| 2021/0088019 | A1* | 3/2021 | Senda | G06N 3/08 |

OTHER PUBLICATIONS

Fang, Yong, et al. "DeepDetectNet vs RLAttackNet: An adversarial method to improve deep learning-based static malware detection model." Plos one 15.4 (2020): e0231626.

Luo, Yilun, et al. "Portable in-cylinder pressure measurement and signal processing system for real-time combustion analysis and engine control." SAE International Journal of Advances and Current Practices in Mobility 2.2020-01-1144 (2020): 3432-3441.

Shih, Peter, et al. "Reinforcement learning based output-feedback control of nonlinear nonstrict feedback discrete-time systems with application to engines." 2007 American Control Conference. IEEE, 2007.

Shih, Peter, et al. "Near optimal output-feedback control of nonlinear discrete-time systems in nonstrict feedback form with application to engines." 2007 international joint conference on neural networks. IEEE, 2007.

Shih, Peter, et al. "Reinforcement-learning-based dual-control methodology for complex nonlinear discrete-time systems with application to spark engine EGR operation." IEEE transactions on neural networks 19.8 (2008): 1369-1388.

Shih, Peter, et al. "Reinforcement-learning-based output-feedback control of nonstrict nonlinear discrete-time systems with application to engine emission control." IEEE Transactions on Systems, Man, and Cybernetics, Part B (Cybernetics) 39.5 (2009): 1162-1179.

Singh, Atmika, et al. "Neural network control of spark ignition engines with high EGR levels." The 2006 IEEE international joint conference on neural network proceedings. IEEE, 2006.

Vance, Jonathan B., et al. "Neural network-based output feedback controller for lean operation of spark ignition engines." 2006 American control conference. IEEE, 2006.

Wick, Maximilian, et al. "Decoupling of consecutive gasoline controlled auto-ignition combustion cycles by field programmable gate array based real-time cylinder pressure analysis." International Journal of Engine Research 19.2 (2018): 153-167.

* cited by examiner

FIGURE 16

COMBUSTION CONTROL USING SPIKING NEURAL NETWORKS

1. PRIORITY CLAIM

This application claims priority to U.S. Provisional Patent Application No. 63/235,241, titled "Dilute Combustion Control Using Spiking Neural Networks", which was filed on Aug. 20, 2021, which is herein incorporated by reference.

2. STATEMENT REGARDING FEDERALLY SPONSORED RESEARCH AND DEVELOPMENT

These inventions were made with United States government support under Contract No. DE-AC05-000R22725 awarded by the United States Department of Energy. The United States government has certain rights in the inventions.

3. TECHNICAL FIELD

This disclosure relates to vehicle controls and more specifically controlling internal combustion engines using spiking neural networks.

4. RELATED ART

Embedded systems control one or more electrical systems in motor vehicles. The systems include engine controls that are used to meet stringent air pollution standards.

The U.S. Energy Information Administration forecasts that gasoline vehicles will remain the dominant vehicle type, comprising over 70% of the market through 2050. Medium- and heavy-duty vehicles will remain dependent on internal combustion engines for the foreseeable future due to their heavier duty cycles, with dilute SI engines offering the potential for efficiency and emissions improvement, particularly in the medium-duty sector.

Dilute combustion is a cost-effective approach to reduce fuel consumption in a variety of engine platforms. However, some pollution control systems used with these engines affects combustion kinetics, reduce the combustion rate and make stable combustion more difficult to achieve. At the combustion stability limit, the ignition becomes highly sensitive to the in-cylinder charge composition and sporadic misfires and partial burns occur, exacerbating cycle-to-cycle variability. These issues may become more pronounced for future medium-duty SI gaseous and low-carbon fuels with reduced flame speeds.

To meet both fuel economy and emission standards, new technologies must be developed. Engine controls must be advanced to meet these standards.

DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views. The patent or application file also contains at least one drawing executed in color. Copies of this patent or patent application publication with color drawing(s) will be provided by the Office upon request and payment of the necessary fee.

FIG. 16 shows the components of an online estimation algorithm for cycle-to-cycle electronic control of spark energy, spark timing, and fuel quantity.

DETAILED DESCRIPTION

Figure 1:
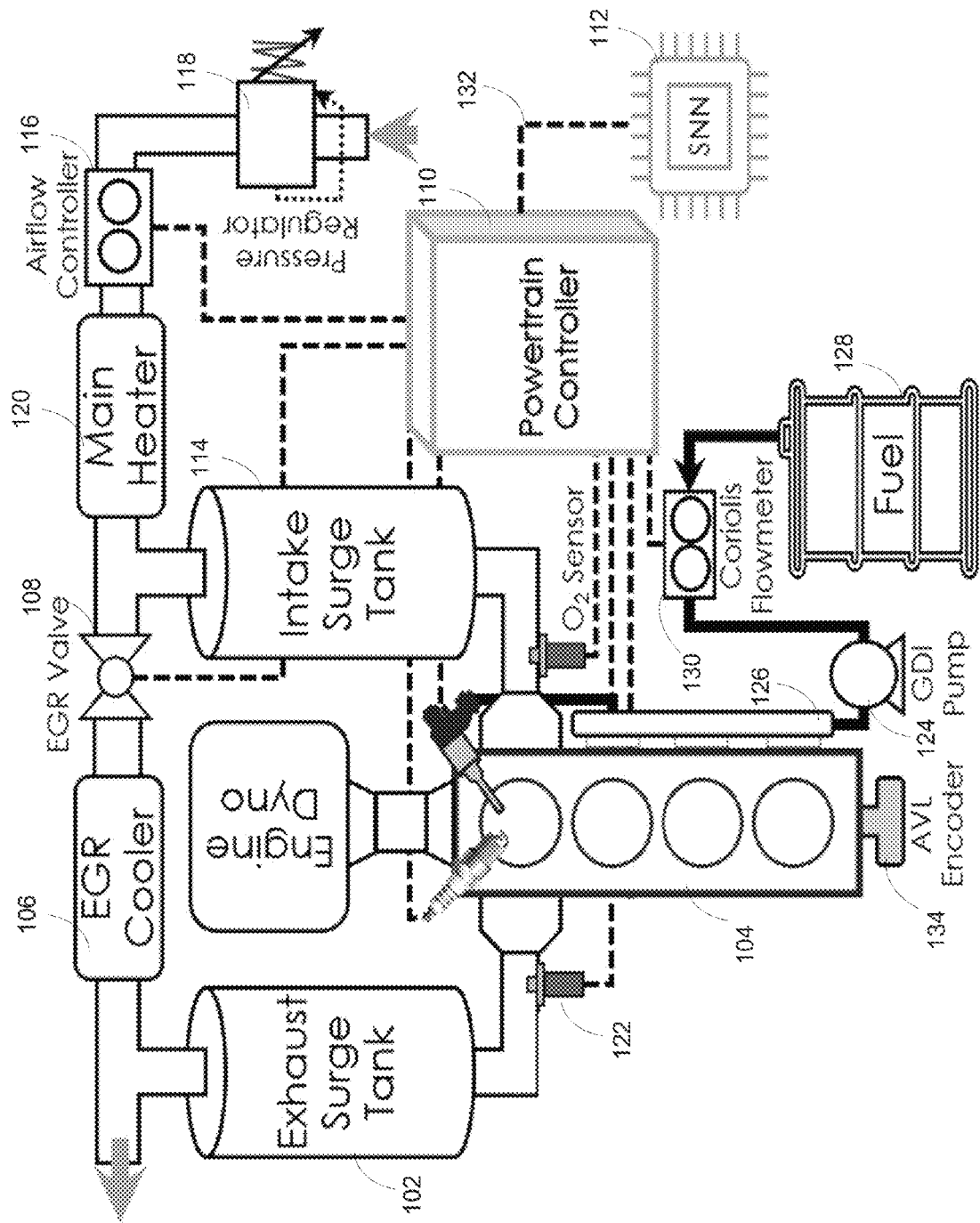
FIG. 1 is an engine controller interfacing a combustion engine.

During combustion, cylinder temperatures in an internal combustion engine may reach 2500 degrees Celsius. At approximately 1375 degrees Celsius, nitrogen in the combustible mixtures may form oxides of nitrogen ($NO_x$). As combustion chamber temperatures increase, so does the level of nitrogen oxides and as the combustion temperatures decrease so does the level of nitrogen oxides. Exhaust gas recirculation reduces the combustion temperature by sending exhaust gas into an intake manifold of a combustion engine. Because exhaust gas is the byproduct of combustion, it is effectively inert meaning it is not readily reactive to other elements in the combustion chambers and thus forms few or no chemical compounds when injected back into combustion chambers.

By metering a percentage of exhaust gas into an intake manifold of a combustion engine and then into the combustion chamber, air/fuel mixtures are diluted with an inert gas cooler than the temperature of the combustion chamber. There is no to very little reaction to the exhaust gas during combustion as it serves as a cooler displacement volume. This results in lower combustion temperatures which reduces combustion engine nitrogen emissions.

To meter exhaust gas into the intake manifold, exhaust gas recirculation valves regulate flow. When actuated by a powertrain controller, the opening, closing, or obstructing channels facilitate or reduce or stop exhaust gas recirculation. An exemplary powertrain controller will allow the filtered exhaust gas to flow back into the combustion chamber when the engine is above a certain temperature, the engine's load is within a predetermined range or exceeds a predetermined threshold (e.g., measured by a mass airflow sensor), the engine reaches a certain rotation-per-minute rate or exceeds a predetermined threshold and/or the fuel flow is above a certain percentage or above a predetermined threshold. In vehicles, engine temperatures may be measured by coolant temperature, engine loads may be measured by manifold absolute pressure sensors, rotations-per-minute rates may be measured by engine speed sensors, and fuel flow may be measured by fuel injector calibration monitoring and the command injection duration or the percent of throttle angle deflection detected by throttle position sensors, for example. In vehicles using torque converter clutch states as a determining factor (e.g., detecting when a torque converter clutch solenoid is actuated), exhaust gas recirculation and modified fuel flow may be obstructed (disengaged or stopped) when the torque converter clutch is engaged. In some vehicle applications, each of the sensors communicate with the powertrain controller that monitors and/or controls some or all of the functions of the engine and other systems besides exhaust gas recirculation including diagnostics, fuel delivery, spark control, other emission controls, vehicle stability, and/or etc.

To further reduce emissions, some systems track cycle-to-cycle viability of the combustion process to further reduce nitrogen oxide emissions from combustion engines. By monitoring cycle-to-cycle variability, these systems further adjust and/or meter the cycle-to-cycle fuel injection quantities and/or inert gas flows into the intake manifold that feed the combustion chamber or chambers. The systems reduce the variability that comes with misfires and partial burns, for example. Using one or more spiking neural networks, the systems manage and/or meter fuel injections and/or inert gas flow to reduce cycle-to-cycle variability while maintaining tailpipe emission targets. The spiking neural network provides real-time control through cycle-resolved dependence of residual gas fractions, in addition to composition control, based on the prior and/or legacy combustion events.

The spiking neural networks are neural networks based more on the functional operation of biological brains than traditional processing executed by artificial neural networks. The spiking neural networks include a notion of time in how these networks process information, allowing them to process temporal data and/or control tasks, which offer an advantage over artificial neural networks when monitoring and controlling cycle-to-cycle variation. The disclosed spiking neural networks that may be implemented in neuromorphic hardware are small and can use low-power hardware allowing the systems to be a unitary part of a powertrain controller in some systems or in communication with the powertrain controller via an in-vehicle bus in others. The in-vehicle bus (e.g., the electronic bus within a vehicle) may be a controller area network bus and/or virtual bus that facilitates and/or enables communication.

Figure 2:
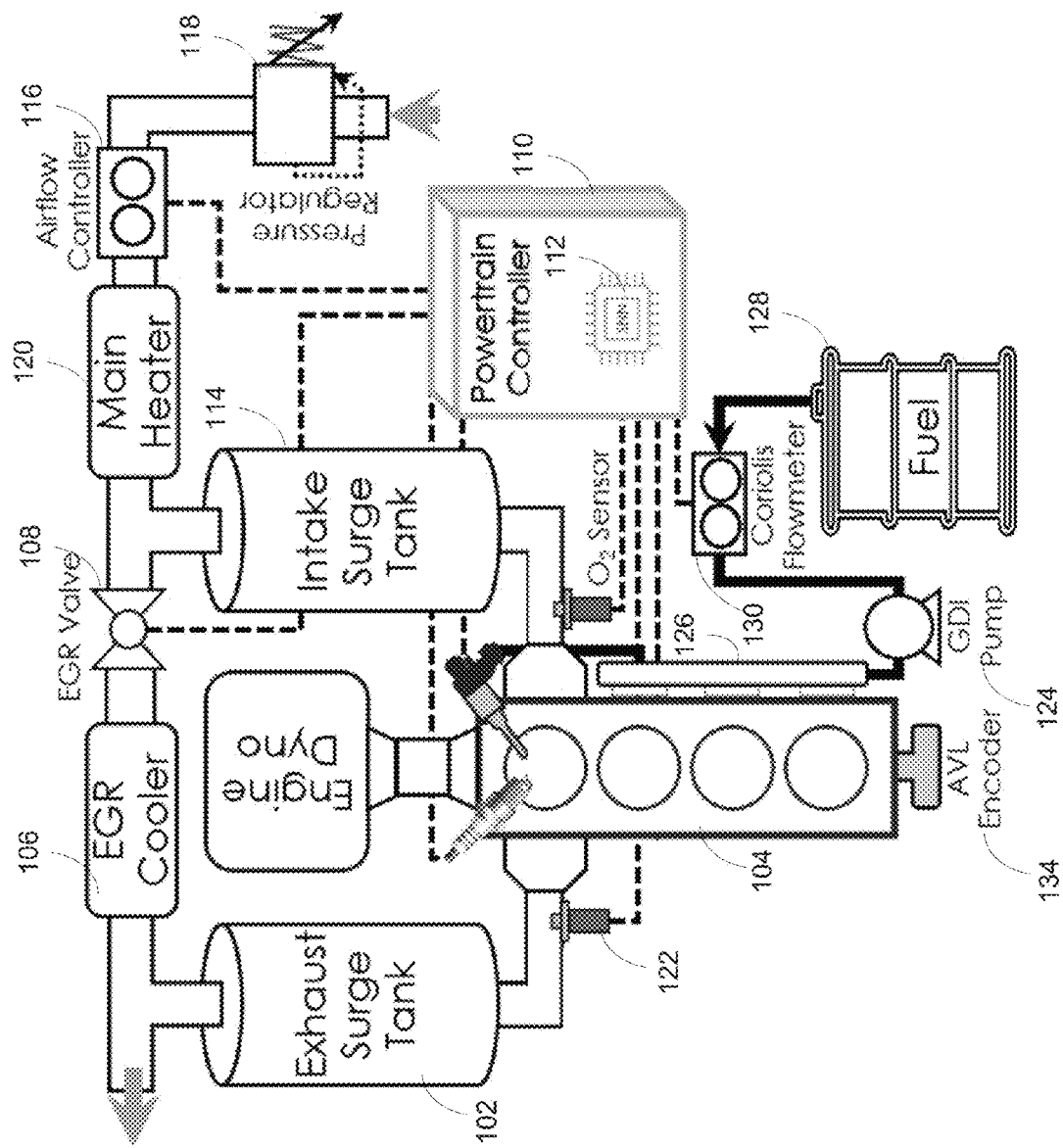
FIG. 2 is an alternative engine controller interfacing a combustion engine.

A powertrain controller is used to monitor and/or control many vehicle systems including exhaust gas recirculation, fuel management, spark control (e.g., spark level and/or timing, spark dwell), air management, etc. At a high level, the system provides a significant reduction in tailpipe emissions with the benefit of increasing fuel economy and/or improved vehicle drivability. FIGS. 1 and 2 and show an exhaust surge tank 102 connected to a combustion engine 104. The exhaust surge tank 102 dampens the effects of pulsating flow that accompanies combustion within a combustion chamber. An exhaust gas recirculation cooler 106 receives some of the exhaust gas coming from a recent combustion event in the engine 104, passes it through filters to remove soot and particles, and passes it back to an exhaust gas recirculation valve 108 controlled by the powertrain controller 110 and in alternate systems, spiking neural network 112. A local and/or virtual bus 132 couples the powertrain controller 110 to the spiking neural network 112 in FIG. 1. In FIG. 2, the powertrain controller 110 comprises the spiking neural network 112 or is integrated with or is a unitary part of the spiking neural network 112.

The powertrain controller 110 and/or the spiking neural network 112 meters flow into an intake manifold (shown as in intake surge tank 114) by grounding the exhaust gas recirculation solenoid and controlling an airflow controller 116 that is sourced by an air pressure regulator 118. An optional main heater 120 heats the outside airflow passing from the airflow controller 116 to ensure ice and/or moisture does not pass into the intake manifold. It is intended for use at low and ambient temperatures. An angle encoder 134 provides crank-angle related measurements of the (internal) combustion engine 104.

An oxygen sensor 122 monitors the oxygen content in the exhaust. An exemplary oxygen sensor 122 is installed so that a plate of the sensor is in contact with the exhaust gas and another plate is in contact with the outside air. At engine start plate on the air-reference side is electrically negative and the plate on the exhaust gas side is positive. When the air/fuel mixture is rich, the electrical charge on the plate in contact with the exhaust gas becomes more positive with the charge on the air reference side not changing. As a result, the voltage difference between the two plates increases. When the air/fuel is lean, the plate on the exhaust gas side of the sensor becomes more negative, decreasing the voltage differences between the plates. If the air/fuel mixture is rich, the oxygen sensor voltage is high. If the air/fuel mixture is lean, the oxygen sensor is low. In alternate systems, newer vehicles (e.g., operating with dilute combustion engines) wideband $O_2$ sensors are used. These systems use a Nernst cell and correlate the pumping current required for the $ZrO_2$ solid-state oxygen ion pump to equalize the concentration in the reaction cell with the environment.

In FIGS. 1 and 2 an injection pump 124 delivers high-pressure fuel 128 into the intake tract or cylinder port 126, which in alternate systems is delivered directly into the combustion chamber of each cylinder of the engine 104. In FIGS. 1 and 2, the powertrain controller 110 modifies the fuels delivery on-time based on the output of the oxygen sensor 122 and in some systems, an optional flowmeter 130. The optional flowmeter 130 measures the volume flow of the fuel 128 for the powertrain controller 110.

Figure 3:
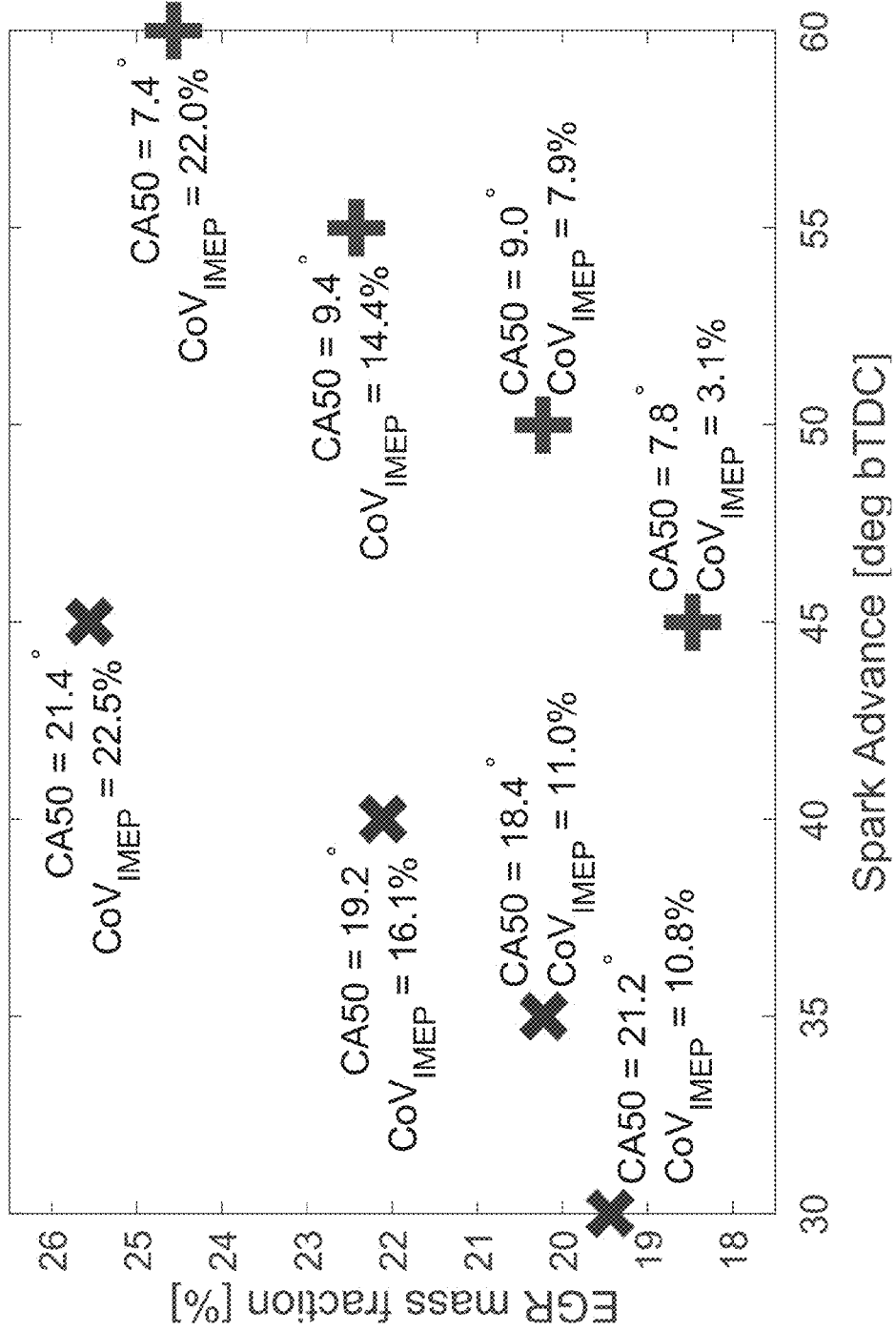
FIG. 3 shows the operating conditions selected for testing the proposed controller at optimal spark conditions (+marker) and retarded spark conditions (x marker).

FIG. 3 shows the cycle-to-cycle variability of dilute combustion at constant engine speed and load with various spark advances. The (x) references correspond to conditions with retarded spark timing and the (+) plus references indicate conditions with optimal combustion phasing. The exemplary engine was run at a constant speed/load condition of about fifteen hundred rotations-per-minute at about seven and seven-tenths bar of indicated mean effective pressure (IMEP). In FIG. 3, the spark advance and amount of exhaust gas recirculation were adjusted to show the different cycle-to-cycle variation characteristics. An engine cycle refers to four-distinct piston strokes (an intake mode, a compression mode, a power delivery mode, and an exhaust mode) of an internal combustion engine. A piston makes two complete passes in the cylinder to complete one operating cycle.

In FIG. 3 about three thousand engine cycles were recorded at each condition. The conditions were divided into two groups based on their combustion phasing, measured by the crank angle where fifty percent fuel mass is burned (CA50). The plus (+) markers represent conditions where CA50 is optimal, close to eight degrees a top dead center (TDC). FIG. 3 shows that electronic spark timing requires a spark advance as the volume of exhaust gas recirculated into combustion chambers increases. The spark advance maintains an optimum spark timing as it compensates for the slow combustion kinetics caused by the higher dilution of exhaust gas.

Cycle-to-cycle variation may be quantified by the coefficient of variation (CoV) of the indicated mean effective pressure. In practice, the exhaust gas recirculation volume is limited to maintain a maximum combustion variability of $CoV_{IMEP}$=3%. Applying an optimal combustion phasing, the condition with the lowest exhaust gas recirculation volume occurs at nineteen percent, which was established as the baseline, and no control action was applied to it.

FIG. 3 shows that the coefficient of variation of the indicated mean effective pressure rapidly increases as exhaust gas recirculation increases. Under a second set of conditions marked by (x), the electronic spark timing was retarded to maintain a combustion phasing of CA50≈20° after top dead center. Here, the retarded combustion phasing conditions are used during cold start conditions where high gas enthalpy is used to warm up the emissions control system. At each combustion cycle k, the gross heat release (Q_gross) is calculated from a single-zone analysis of a closed system (between intake valve closing and the exhaust valve opening), neglecting the effects of blow-by and crevice volume losses, as described by equation 1.

$$Q_{gross}[k] = \int_{IVC}^{EVO} \frac{1}{\gamma_\theta - 1} V \frac{dP[k]}{d\theta} + \frac{\gamma_\theta}{\gamma_\theta - 1} P[k] \frac{dV}{d\theta} + \frac{dQ_{HT}[k]}{d\theta} \quad (1)$$

Here, V is the in-cylinder volume, P[k] is the in-cylinder pressure during cycle k, θ is the crank angle position, and $\gamma_\theta$ is the polytropic coefficient which changes linearly with respect to θ from $\gamma_C$=1.42 during compression to $\gamma_E$=1.28 after the combustion is completed. The last term represents the convective heat transfer to the cylinder walls which was calculated as equation 2.

$$\frac{dQ_{HT}[k]}{dt} = HT_{mult} A_{cyl} h_{Woschni}[k](T[k] - T_{wall}) \quad (2)$$

The rate of heat transfer depends on the cylinder wall area $A_{cyl}$, the Woschni heat transfer coefficient $h_{Woschni}[k]$, and the difference between the cylinder wall temperature $T_{wall}$=500 K, assumed to be constant, and the bulk gas temperature at cycle k calculated as equation 3.

$$T[k] = \frac{P[k]V}{R(M_{fuel}[k] + M_{air}[k] + M_{inert}[k])} \quad (3)$$

The constant parameter R=287 J/kgK corresponds to the ideal gas constant for dry air. At cycle k, the total in-cylinder mass is composed of the masses of fuel $M_{fuel}[k]$, air $M_{air}[k]$, and burned (inert) gas $M_{inert}[k]$. In addition, a heat transfer multiplier $HT_{mult} \in [0.6, 0.75]$, which decreases with advanced spark timing, was used to calibrate the calculated value of combustion efficiency and match the measured value from the exhaust gas analyzer.

$$\eta_c[k] = \frac{Q_{gross}[k]}{M_{fuel}[k] Q_{LHV}} \quad (4)$$

A regular fuel, such as RD5-87 (a Regular-E10 gasoline) has a lower heating value of $Q_{LHV}$=41.61 MJ/kg, as measured by the American Society for Testing Materials method D240.

Figure 4:
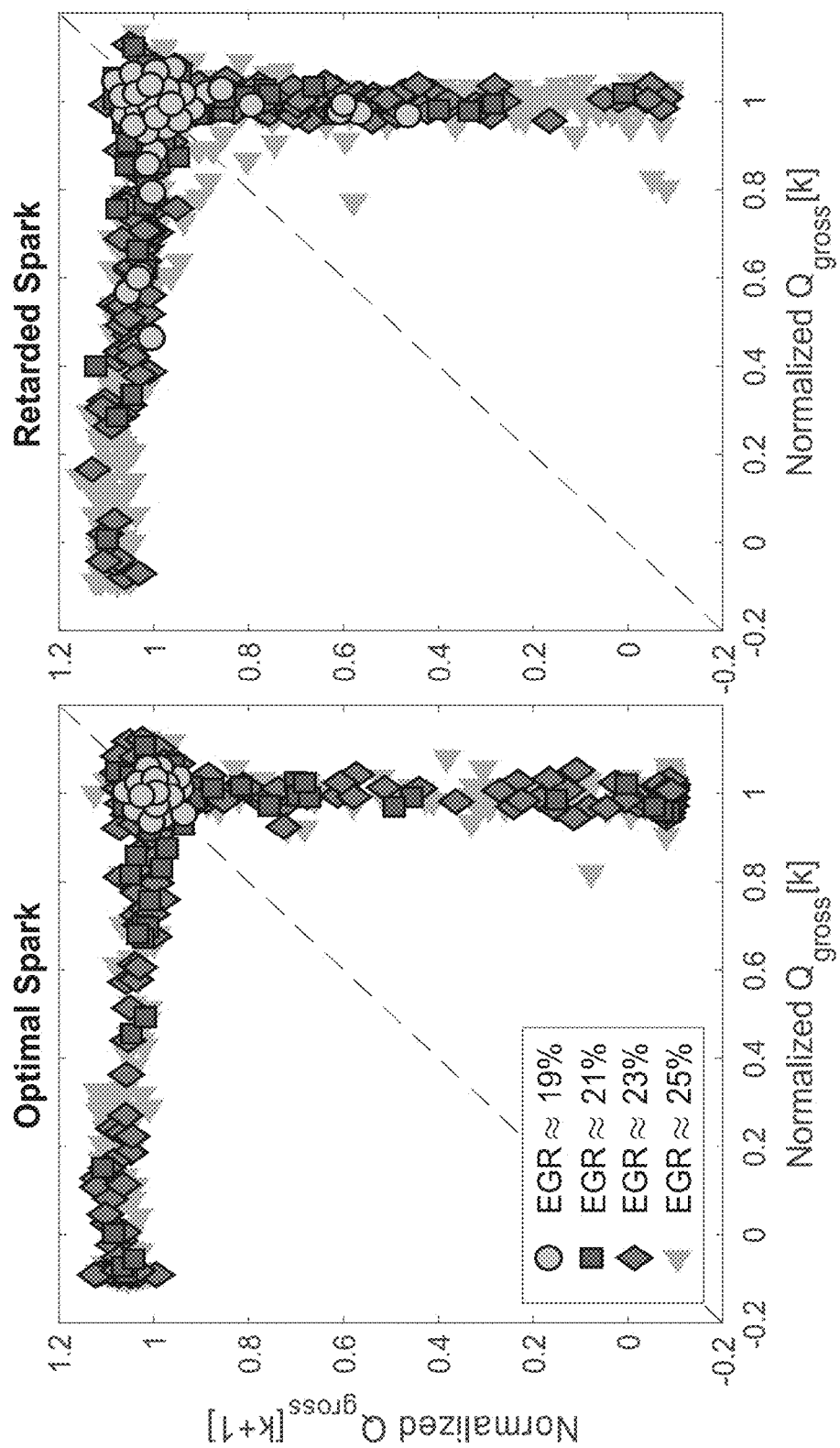
FIG. 4 shows return maps of normalized gross heat release at various levels of exhaust gas recirculation for optimal spark conditions (on the left) and retarded spark conditions (on the right).

FIG. 4 shows the return maps for the normalized gross heat release at various exhaust gas recirculation levels. The left plot shows the return maps for the conditions at optimal spark advance. The baseline condition at around nineteen percent exhaust gas recirculation fraction shows a completely random behavior centered at the nominal value. As exhaust gas recirculation levels increase, however, misfire and partial burns occur sporadically, and the return map presents two asymmetric arms extending towards low-energy events. Similarly, the right plot shows the return maps for the retarded spark conditions. In this use case, the baseline case already presents some partial-burn events, which corroborates the high coefficient of variation of indicated mean effective pressure value of ten point eight percent indicated in FIG. 3. As exhaust gas recirculation levels increase, the high values of the coefficient of variation are substantially caused by partial burns. In contrast, at optimal spark conditions there is a higher density of low-energy events compared with medium-energy events. For instance, at twenty three percent exhaust gas recirculation (blue diamonds), the return map at optimal spark presents more events at low energy, −0.2<Q_gross<0.3, than events at medium energy, 0.4<Q_gross<0.7. On the other hand, the return map at retarded spark with similar exhaust gas recirculation levels has a higher concentration of events at medium energies. This is one of the differences between the cycle-to-cycle variation characteristics at optimal and retarded spark timings.

The similarity between all conditions at high levels of exhaust gas recirculation, however, includes the deterministic patterns that emerge when low-energy events occur. The asymmetric nature of the return maps, favoring high-energy events after (low-energy) partial burns and misfires indicate a prior-cycle correlation. The algorithm uses this correlation to generate a next-cycle control strategy to adjust the fuel injection quantity and reduce the combustion cycle-to-cycle variation.

The systems control-oriented approach can be implemented using a physics-based model based on the masses of fuel, air, and inert gas. The total in-cylinder mass in each cycle is comprised of the residual gas from the previous cycle and the fresh mass admitted to the cylinder. Equation five predicts the successive state, K+1, using the current state, K.

$$\begin{bmatrix} M_{fuel} \\ M_{air} \\ M_{inert} \end{bmatrix}_{k+1} = X_{res}[k] \begin{bmatrix} 1-\eta_c[k] & 0 & 0 \\ -AFR_s\eta_c[k] & 1 & 0 \\ (1+AFR_s)\eta_c[k] & 0 & 1 \end{bmatrix} \begin{bmatrix} M_{fuel} \\ M_{air} \\ M_{inert} \end{bmatrix}_k + \begin{bmatrix} 0 \\ 1 \\ \frac{X_{EGR}}{1-X_{EGR}} \end{bmatrix} m_{air} + \begin{bmatrix} 1 \\ 0 \\ 0 \end{bmatrix} m_{fuel}[k] Q_{gross}[k] = \eta_c[k] M_{fuel}[k] Q_{LHV} \quad (5)$$

The state of the system includes the total in-cylinder masses of fuel, air, and inert burned gas at any given cycle $x_k = [M_{fuel} \, M_{air} \, M_{inert}]_k^T$. The constant parameter $AFR_S = 14.7$ is the stoichiometric air-to-fuel ratio. In this derivation the fresh air mass $m_{air}$ and the exhaust gas recirculation mass fraction $X_{EGR}$ are held constants at a given experimental condition. The control command corresponds to the injected fuel mass $u_k = m_{fuel}[k]$ and is adjusted in a cycle-to-cycle basis by the spiking neural network controller. The model parameters $X_{res}[k]$ and $\eta_c[k]$ represent the residual gas fraction and the combustion efficiency, which vary at each cycle. Here, $\eta_c[k]$ is calculated from the heat release analysis. The residual gas fraction, that changes in every cycle, was estimated using an isentropic exhaust process from the exhaust valve opening (EVO) to the exhaust valve closing (EVC) as expressed in equation 6.

$$X_{res}[k] = \frac{V_{EVC}}{V_{EVO}} \left( \frac{P_{EVC}[k]}{P_{EVO}[k]} \right)^{1/\gamma_E} \quad (6)$$

When the model is virtually simulated (e.g., on a host computer) to estimate the in-cylinder states, the in-cylinder pressure at the exhaust valve closing is replaced by the average exhaust manifold pressure ($P_{EVC}[k] = \bar{P}_{exh} \approx 1$ bar) to terminate the calculations at the exhaust valve opening instead of at the exhaust valve closing. This modification allowed the powertrain controller 110 enough time to communicate with the system and to issue the appropriate control command before the next combustion cycle begins.

When simulating the system off-line and training the spiking neural networks 112, the model parameters for the residual gas faction of the current state, $X_{res}[k]$, and the combustion efficiency of the current state $\eta_c[k]$ were calculated as functions of the state $x_k \in R^3$. To reduce dimensionality, the gas-fuel equivalence ratio was defined as a proxy for the in-cylinder composition as expressed by lambda prime in equation 7.

$$\lambda'[k] = f_\lambda(x_k) = \frac{M_{air}[k] + M_{inert}[k]}{M_{fuel}[k]} \cdot \frac{1}{AFR_s} \quad (7)$$

Figure 5:
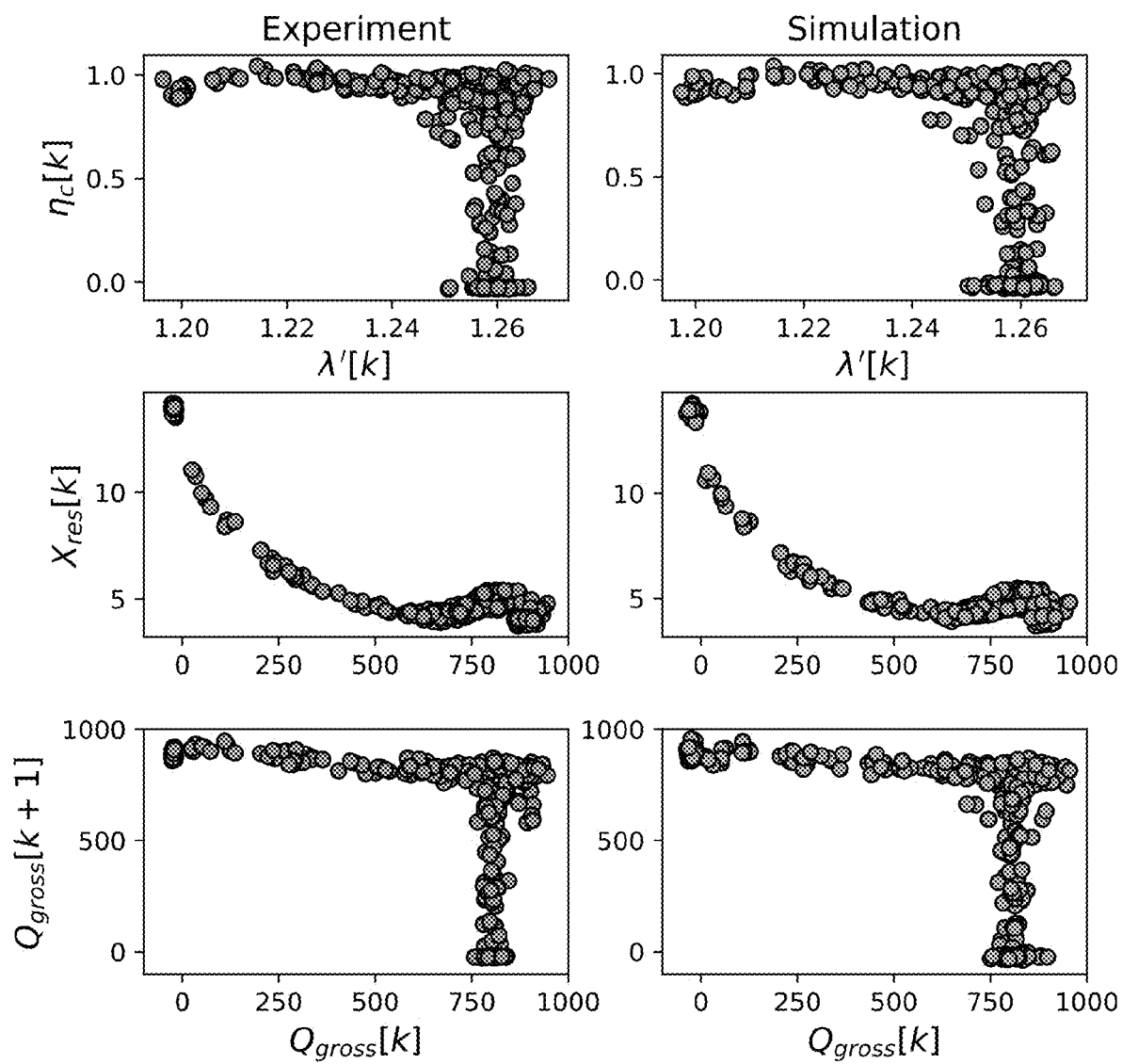
FIG. 5 is a comparison between open-loop experimental model parameters (on the left) and simulated model parameters (on the right) using a hybrid modeling.

FIG. 5 is a comparison between the open-loop experimental model (e.g., the powertrain controller 110 uses "look up" tables to calculate the amount of air and fuel to deliver to the engine 104) where the parameters are estimated from measurements collected from an operational engine (positioned on the left) and simulated model parameters (positioned to the right) using a hybrid modeling. The top-left plot of FIG. 5 shows that the combustion efficiency can be written as a function of the gas-fuel equivalence ratio: $f_\eta$: $\lambda' \to \eta_c$. Similarly, the second-left plot shows that the residual gas fraction depends on the gross heat release $f_X$: $Q_{gross} \to X_{res}$, which intrinsically depends on the system states.

In short, the right column of FIG. 5 shows the simulated values for the model parameters $X_{res}[k]$ and $\eta_c[k]$. The bottom row compares the return maps for the measured (left) and simulated (right) gross heat release. The hybrid approach utilizing a physics-based model and the machine learning-based kernel density estimator for the model parameters provided accurate values for dynamic behavior.

To identify the parameters for offline simulations, dyno instrumentation that included airflow measurements, oxygen measurements via oxygen sensors 122, and engine speed measurements from a crank angle encoder were used. In addition, in-cylinder pressure data was processed for estimating the cycle-to-cycle energy release. Data for the offline combustion model were collected from a single operating condition using five thousand engine cycles, a value sufficient to capture the dynamic properties of the system and statistically characterize it. The offline simulations were used to train the spiking neural networks 112 in closed loop to reduce combustion cycle-to-cycle variation and, simultaneously, to optimize the network structure and parameters before it was implemented in hardware.

The mappings $f_\eta$ and $f_X$, present a stochastic nature that can be modeled by an appropriate choice of random variables. Under a probabilistic framework, the model parameters $X_{res}[k]$ and $\eta_c[k]$ can be seen as random variables sampled from the following conditional probability density functions as expressed in equation 8.

$$\eta_c[k] \sim f_{\eta|\lambda}(\eta|\lambda'[k]) \text{ and } X_{res}[k] \sim f_{X|Q}(X_{res}|Q_{gross}[k]) \quad (8)$$

Given that the distributions cannot be accurately regressed by standard parametric probability density functions, the nonparametric kernel density estimator was used to simulate the model since it provides accurate estimates for arbitrary distributions. The unsupervised kernel density estimator for the conditional density $f_{X|Y}(X=x|Y=y)$ using N number of observations $\{X_i, Y_i\}_{1 \le i \le N}$ can be calculated as expressed in equation 9.

$$\hat{f}_{X|Y}(x|Y=y) = \frac{1}{h_X} \cdot \frac{\sum_{i=1}^{N} K\left(\frac{X_i - x}{h_X}\right) K\left(\frac{Y_i - y}{h_Y}\right)}{\sum_{j=1}^{N} K\left(\frac{Y_j - y}{h_Y}\right)} \quad (9)$$

where $K(z) = (2\pi)^{-0.5} e^{-0.5 z^2}$ is the Gaussian kernel function and $h_X$, $h_Y$ are the bandwidths hyperparameters chosen using the maximum-likelihood leave-one-out cross-validation.

An inverse cumulative distribution function sampling obtained the cycle-to-cycle values of $\eta_c[k]$ and $X_{res}[k]$ during simulations. The vector of uniform random variables $w_k[w_\eta[k] \, w_X[k]]^T \sim U(0,1)$ introduces the uncertainty observed in the data. Simulations were completed by evaluating the cumulative distribution function at the corresponding random variable as follows:

$$\eta_c[k] = \hat{F}^{-1}_{\eta|\lambda}(w_\eta[k]|\lambda'[k]) \quad (10)$$

$$X_{res}[k] = \hat{F}^{-1}_{X|Q}(w_X[k]|Q_{gross}[k])$$

The modeling renders a nonlinear stochastic system for offline simulations of the form:

$$x_{k+1} = f(x_k, u_k, w_k), \ w_k \sim U(0,1) \quad (11)$$

Some spiking neural networks 112 comprised of neurons and synapses, for example, implemented the controller. Synapses in the spiking neural network 112 use different delay values, which determine how long it takes for charge to travel along each synapse. Neurons in the spiking neural networks 112 accumulate charge over time and fire when the neuron's threshold is reached. Unlike artificial neural networks, the spiking neural network's communication through neurons occur asynchronously, occurring whenever each individual neuron reaches its threshold. Because of its temporal processing, the spiking neural networks 112 analyze the temporal data. With respect to control tasks, the spiking neural network 112 accumulates information from all previous observations over the course of simulation to inform the current action taken, rather than deciding based on a fixed number of previous observations. Here, the systems use an integrate-and-fire neuron structure. The charge accumulation for one of the system's neurons may be expressed as equation 12.

$$A_j(t) = A_j(t-1) + \sum_{i=1}^{N} w_{i,j} S_i(t - d_{i,j}) \quad (12)$$

In equation 12 $A_j(t)$ is the amount of charge accumulated on neuron j, at time t, $w_{i,j}$ is the weight of the synapse between neuron i and j (or 0 if no such synapse exists), and $d_{i,j}$ is the delay of the synapse between neuron i and j. $S_i(t)$, a binary function that says whether or not neuron i spikes at t, is calculated as follows:

$$S_i(t) = \begin{cases} 1 & \text{if } A_i(t) > \tau_i \\ 0 & \text{otherwise} \end{cases} \quad (13)$$

where $\tau_i$ is the threshold of neuron i.

To evaluate how a spiking neural network 112 performs powertrain controllers' tasks, the spiking neural network 112 was connected to the engine simulator (and, in the future, the engine itself). The engine simulator is expressed as equation 5. For this task, the engine simulator, e.g., or the engine, produces a set of observations, e.g., $M_{fuel}$, $M_{air}$, $M_{inert}$ that were processed by the spiking neural network 112. Each of the observations were numerical values that were converted into spikes. Using neuromorphic architectures, such as those expressed in a TENNLab framework, the values were encoded into spikes. Some frameworks have fixed the spike encoding schemes, which in this application utilized 10 bins for each input. All the observations have a nominal range in which they will appear, [a, b]. With 10 bins, these ranges were split into 10 equal-sized ranges, $$\left[a, a + \frac{(b-a)}{10}\right], \left[a + \frac{(b-a)}{10}, a + \frac{2(b-a)}{10}\right],$$

etc. An input neuron was created for each of these ranges. Then, for a given observation value x, the neuron corresponding to the appropriate range was spiked once to indicate that value to the network. Because there are three input values, there are a total of 30 input neurons. Neurons in this exemplary spiking neural network 112 are indicated with identification values. Neurons 0-9 correspond to the bins for fuel observation value, neurons 10-19 correspond to bins for air observation value, and neurons 20-29 correspond to the inert gas observation value.

Once the input spikes were created by the input encoder, the spikes were transmitted to the spiking neural network 112 simulator in some applications, and a standalone in situ spiking neural network hardware connected to a physical powertrain controller 110 coupled to an internal combustion engine 104, in other alternate applications. In each training implementation, the spiking neural networks 112 were run for some number of time steps to allow the spiking neural network 112 to decide on an action based on its previous observations. In some training applications, the spiking neural network 112 executed between 50-100 time steps. In other applications, the number of steps varied depending on the desired performance and accuracy. Like the encoding step, both spiking neural networks 112 produced spikes as outputs. These spikes were converted into a metered fuel adjustment rate, and/or other action. In some exhaust gas recirculation applications, spikes cause fuel adjustments to be made or a metered amount of fuel injected into an intake manifold, a combustion chamber, or cylinder port.

An evolutionary optimization process trained neuromorphic systems off-line, and determined both their structure, e.g., number of neurons, synapses, dendrites, axons, how they were connected, and the respective parameters, e.g., weights of synapses $w_{i,j}$, delays of synapses $d_{i,j}$, and thresholds of neurons $\tau_i$. The evolutionary optimization process began with a population of M randomly initialized potential spiking neural networks 112 (SNN) as represented in FIGS. 6-9.

An exemplary evolutionary optimization process training the spiking neural networks 112 begins with the transfer of one or more spiking neural network vectors that encode a plurality of distinct spiking neural network 112 from a memory. To ensure each first training engine receives a different spiking neural network 112 to generate/train/evaluate per cycle—that is one network per cycle, an evaluation queue in a memory is filled with diverse and distinct spiking neural networks 112 that are more than the number of the first training engines of the evolutionary optimization process. The spiking neural networks 112 may be randomly generated based on predetermined initial values of network parameters such as weights and tolerance ranges (e.g., the number of input/outputs established by a user), and/or may be specific pre-generated spiking neural networks 112 created prior to the beginning of the evolutionary optimization process.

Figure 7:
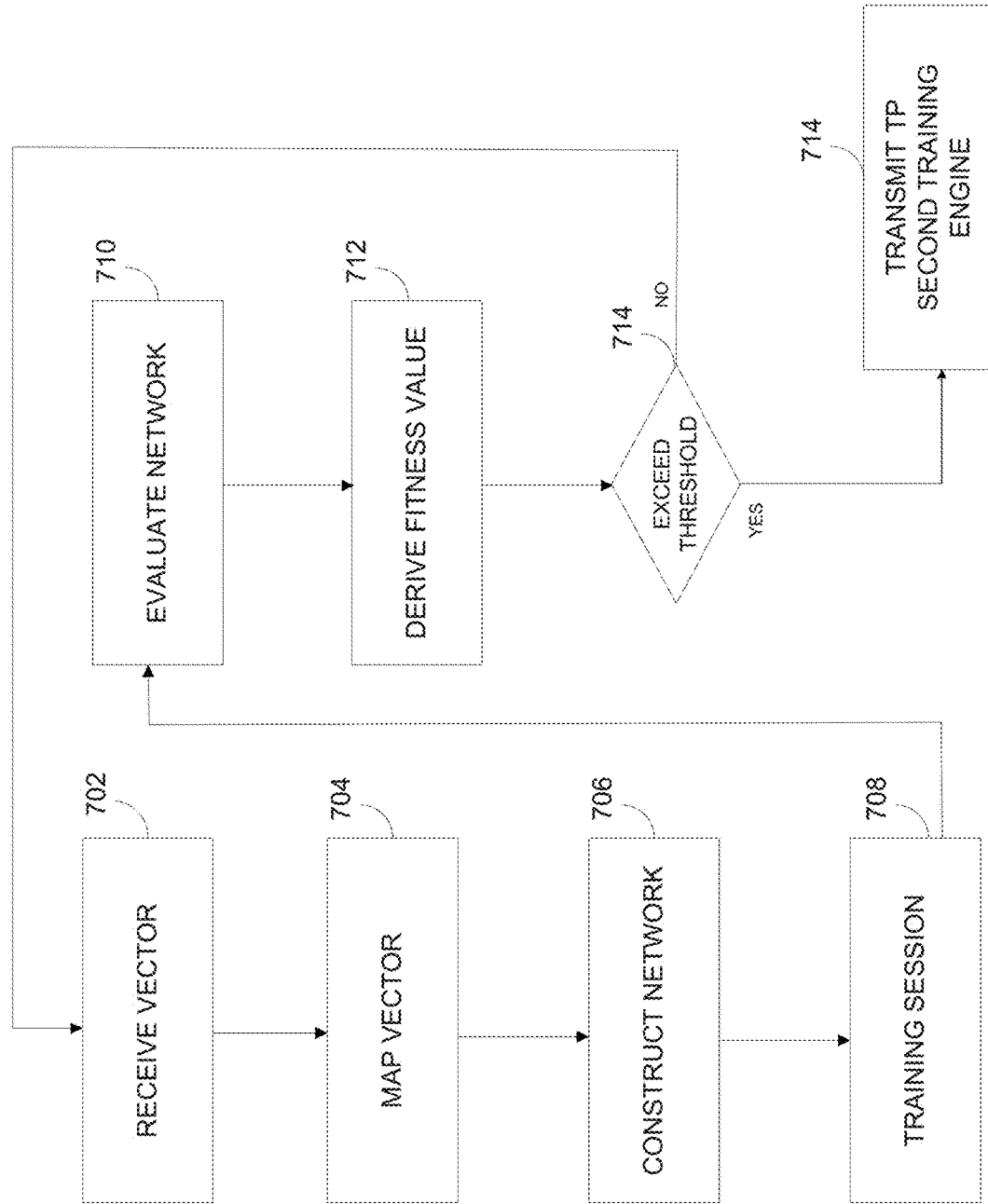
FIG. 7 is a flow diagram of a spiking neural network construction and an exemplary evolutionary evaluation executed by a first training engine.

When the evaluation queue receives a request for a spiking neural network 112, the evaluation queue transfers one or more network vectors to the requesting first training engine that represent one spiking neural network 112 at 702 in FIG. 7. When the one or more network vectors are received, the requesting first training engine decodes the one or more network vectors by mapping the parameters to a spiking neural network 112 at 704 as represented in FIG. 7. The requesting first training engine then constructs the spiking neural network 112 at 706 and trains the constructed spiking neural network 112 using learning data representations or a training dataset stored in a local memory or a remotely accessible memory using a machine-learning algorithm. Training may occur through a fixed number of iterations, a predetermined amount of time, and/or until the constructed spiking neural network 112 hits or reaches a fitness threshold during a training session at 708. Some spiking neural networks 112 train by iteratively reading a training dataset set a predetermined number of times while tuning the spiking neural network's configuration. At 710, the trained spiking neural network 112 is evaluated by processing an evaluation dataset that is separate from and different from the training dataset. Based on the trained spiking neural network's performance, the first training engine calculates a fitness value or an average fitness value. In some use cases, a user or an application defines the evaluation or fitness function that is executed.

Figure 8:
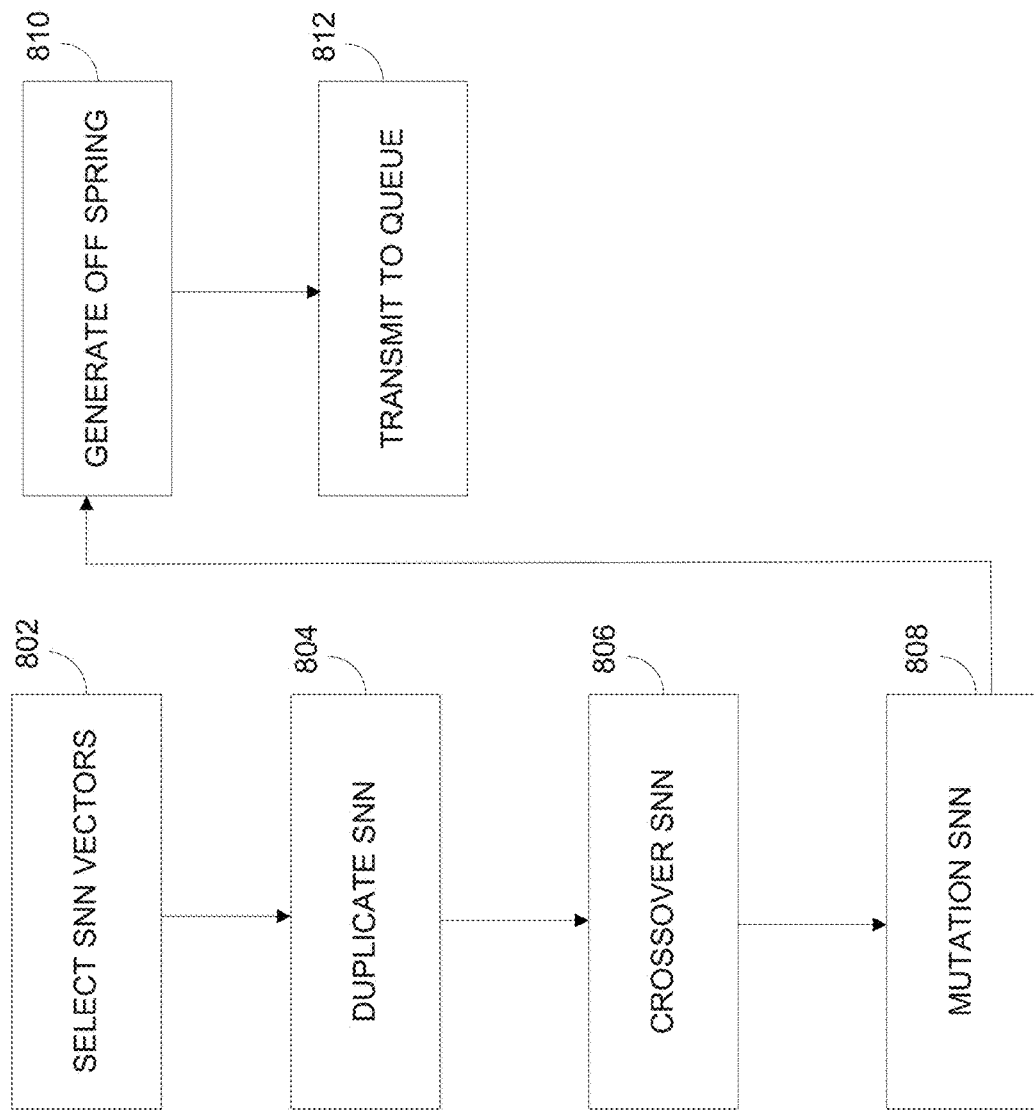
FIG. 8 is a flow diagram of an exemplary evolutionary optimization process executed by a second training engine.

When one or more fitness values exceed a predetermined threshold, a second training engine selects the vector associated with these spiking neural network 112 at 802 and executes the exemplary evolutionary optimization process shown in FIG. 8. The exemplary evolutionary optimization process executes a network duplication at 804. A duplication is characterized by a production of multiple copies of a selected network vector. Duplication occurs by copying those network vectors that represent the spiking neural network 112 that meet or exceed the predetermined static or dynamic fitness value or threshold. The timing of the duplication and the number copies of the network vector made by the second training engine may depend on the number of networks downloaded from the evaluation queue and the time spent constructing, training, and evaluating the spiking neural network 112 by the training engine.

At 806 the second training engine executes a crossing-over in which two copies of the one or more network vectors that represent two selected spiking neural networks 112 exchange equal vector segments with each other. The vector breaks occur at random but corresponding points in the one or more vectors or vector groups. Breaks at corresponding points means that the segments that are broken off contain corresponding network vector segments. The broken sections are then exchanged between the replicated selected networks to form a completely new spiking neural network 112 or offspring. Crossing over results in a recombination of the one or more network vector segments found in the first selected spiking neural network 112 that would otherwise be used without crossover. The offspring's architecture likely differs from the source network's architecture because they are formed from a combination from both source networks.

The frequency of the crossing-over varies with each application. In some systems it is based on time and in other systems it varies with the complexity of the spiking neural networks 112. Further, spiking neural networks 112 that are built, trained, and evaluated faster than the other spiking neural networks 112 may have a greater influence on the offspring as those spiking neural networks 112 may render networks more frequently due to their superior performance. Further, by using a random break or a random swap of one or more vector portions between the replicated source networks in the crossing-over process, the disclosed crossing-over process counteracts the tendency of linked networks.

With each of the selected sourced networks trained by the first training engine crossed over with one another through a duplication and a crossing-over by the second training engine, random changes are made to portions of one or more of the network vectors of the offspring at 808. A mutation may randomly select and randomly change some or all portions of a field in the vector encoding of a randomly selected offspring. A change to the network vector may modify a synapse portion, a dendrite portion, a neuron portion, and/or axon portion resulting in a completely different spiking neural network 112. The mutations randomly alter the characteristics passed on from the source networks by modifying one or more vector fields. Most mutations to some or all of the offspring (in which vector segment portions are randomly changed and/or exchanged) may be detrimental to the offspring's performance, since any change to a portion of the spiking neural network 112 assessed to have a high or acceptable fitness value and trained to a dataset may change a programmed function of the network. Nonetheless, in the disclosed evolutionary optimization process, mutations improve the evolved spiking neural network 112 as the random mutations of one or more portions of the network vectors that represent the offspring allows the spiking neural network 112 to adapt to untrained, untested, and unforeseen environmental changes or dataset changes and contribute to the evolutionary development that results in greater efficiency, accuracy, and less complex optimized spiking neural network 112.

Because the disclosed exemplary evolutionary optimization process is repeated a specific number of times, or executed during a predetermined period of time, or run until a particular condition or a performance metric is met or exceeded (e.g., any number of iterative cycles), network vector segments that are eliminated by the crossing over process and/or the mutation process are maintained or tracked in the meta data associated with offspring. While eliminated, the vector encoding is maintained so that it may be added back to the network vector in the next evolutionary cycle during a subsequent crossing-over or mutation if it is selected by the second training engine. Further, the crossing-over process and/or the mutation process can move processing sequences that flow through the pipelines in a network by rearranging synapse, dendrite, and neuron functions.

With selection, crossing-over, and mutation executed at 802-808, other networks drawn from the evaluation queue are constructed and evaluated at the second training engine and offspring population are generated at 810 and transmitted with their respective meta data to the evaluation queue and at 812 stored in memory. These processes execute simultaneously and/or in parallel (e.g., via multiprocessing, where each processing unit or a group of processing units work in tandem on a separate network and a different process; one processor or group may construct, train, and evaluate a network, another may execute a network vector duplication, another may execute a network vector mutation at the same time). In FIG. 8, the offspring are inserted at the bottom of the evaluation queue of the memory to be reevaluated by the first training engine in subsequent training sessions. The process then repeats until a stopping condition or a performance metric is reached or exceeded.

Figure 6:
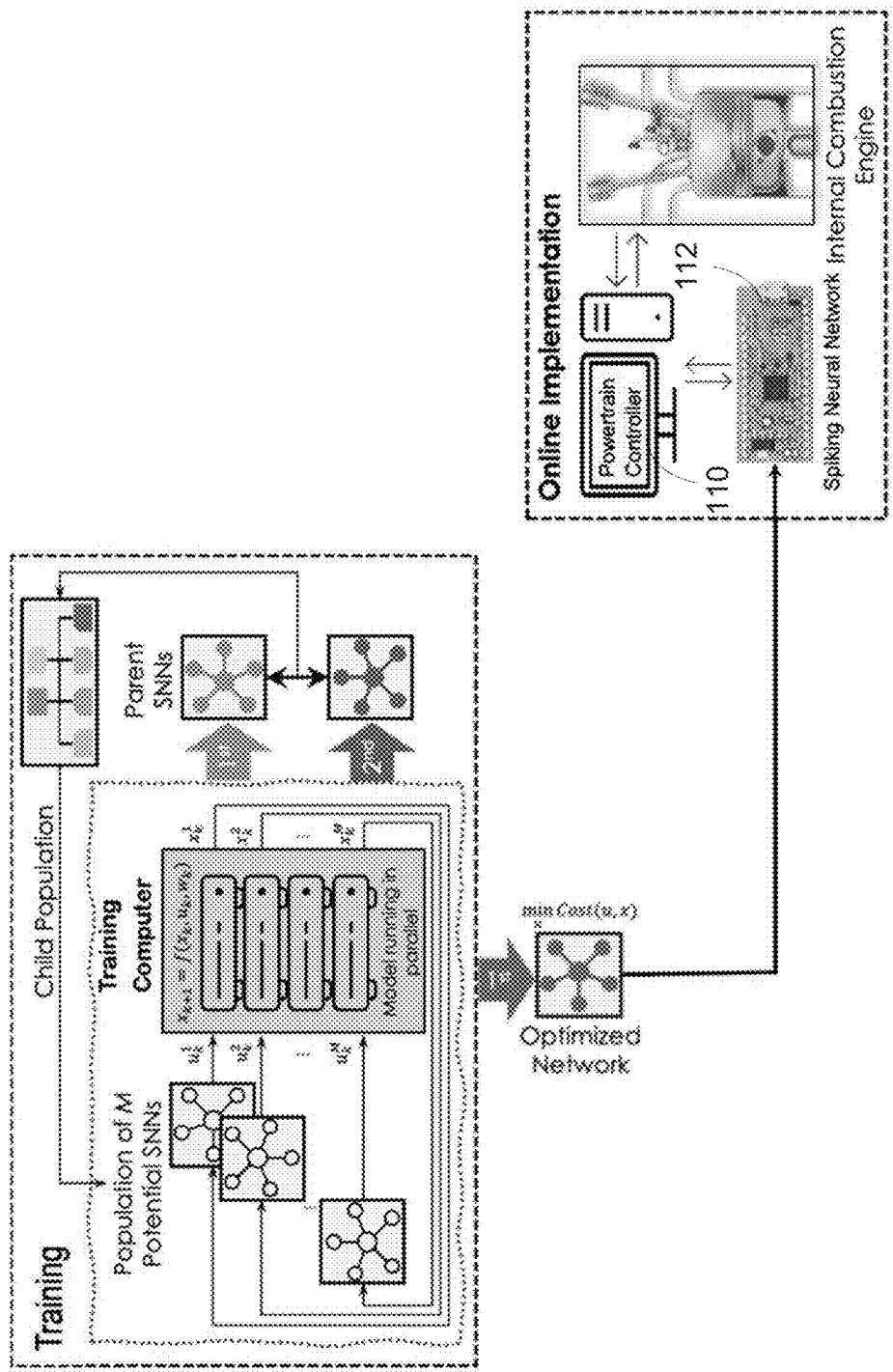
FIG. 6 is an optimization process that trains spiking neural networks.

A hybrid control-oriented model maybe used to simulate the engine behavior as part of the evaluation process of FIGS. 6-8. At any cycle k, the model outputs the states of the system, namely $x_k = [M_{fuel}\ M_{air}\ M_{inert}]_k^T$. Before passing the current state value to the spiking neural network 112, the state space may be discretized. Each component can be classified into one of ten equal-sized bins to create input neurons. For example, neurons in the input layer are indicated with index values. Neurons 0-9 correspond to the bins for in-cylinder fuel $M_{fuel}$, neurons 10-19 correspond to bins for in-cylinder air $M_{air}$, and neurons 20-29 correspond to bins for inert gas $M_{inert}$. After the inputs propagate through the network, the output layer produces one of 12 fixed fuel injection quantities ($u_k$), as shown in Table 1.

TABLE 1 spiking neural network output layer
(fuel injection quantity command)

| Neuron | Fuel | Relative |
|---|---|---|
| 30 | 20.63 mg | $m_{fuel,0}$ |
| 31 | 20.42 mg | $m_{fuel,0}$ |
| 32 | 20.68 mg | $m_{fuel,0}$ |
| 33 | 20.73 mg | $m_{fuel,0}$ |
| 34 | 20.78 mg | $m_{fuel,0}$ |
| 35 | 20.83 mg | $m_{fuel,0}$ |
| 36 | 20.88 mg | $m_{fuel,0}$ |
| 37 | 20.94 mg | $m_{fuel,0}$ |
| 38 | 20.99 mg | $m_{fuel,0}$ |
| 39 | 21.04 mg | $m_{fuel,0}$ |
| 40 | 21.25 mg | $m_{fuel,0}$ |
| 41 | 21.45 mg | $m_{fuel,0}$ |

The possible control commands may be chosen to favor values close to the nominal fuel injection quantity to avoid large deviations from stoichiometric conditions.

The objective function in the disclosed evolutionary optimization process is to minimize the amount of combustion cycle-to-cycle variation, while simultaneously minimizing the additional amount of fuel needed to stabilize the charge. To that end, equation 14 may define the fitness function.

$$\text{Cost}(x_1, \ldots, x_{5000}) = \sum_{k=1}^{5000} \sigma_f \left( \frac{m_{fuel,in}[k]}{m_{fuel,0}} - 1 \right)^2 + \sigma_Q \left( \frac{Q_{gross}[k]}{Q_{gross,0}} - 1 \right)^2 + \sigma_n g(Q_{gross}[k]) \quad (14)$$

Here, $m_{fuel,0}$ and $Q_{gross,0}$ are the nominal values of fuel quantity and gross heat release, considered as constants. The function $g(\bullet)$ penalizes the occurrence of partial burns and misfires as follows:

$$g(Q_{gross}[k]) = \begin{cases} 0 & \text{if } Q_{gross}[k] \geq 645\, J \\ 1 & \text{if } Q_{gross}[k] < 645\, J \end{cases} \quad (15)$$

where $Q_{gross} = 645\, J$ corresponds to the threshold of eighty percent energy release with respect to the nominal value $Q_{gross,0}$. The weighting factors reflect the importance of each term in the cost function and were chosen as $\sigma_f = 10^4$, $\sigma_Q = 1$, and $\sigma_n = 500$. The proposed objective function penalizes events that contribute to high coefficient of variation values. This is advantageous over conventional proportional-integral (PI) control where the fuel commands only target the average value of $Q_{gross}$ instead of its coefficient of variation.

For each spiking neural network 112 evaluation during the evolutionary optimization training, predetermined cycles were simulated (e.g., five thousand times), and the value of the cost function was calculated. The spiking neural networks 112 with the minimum cost were chosen to reproduce the next generation. In an exemplary application, the training was run on a predetermined number of training virtual engines (e.g., twenty-eight in an exemplary use case), and each training engine on the training host computer ran an individual evolutionary optimization process simultaneously. The training process was equivalent to running a predetermined number (e.g., twenty-eight in this use case) standard workstations in parallel. Each of the training computer's training engines had two or more cores (e.g., forty-two cores in this use case). As such, at a scale of twenty-eight nodes and forty-two cores, it was possible to evaluate over one-thousand-one-hundred spiking neural networks 112 simultaneously. Each of the individual evolutionary optimization processes utilized a predetermined population size. In the exemplary use case, one-hundred spiking neural networks 112 comprised the initial population. Those initial population spiking neural networks 112 comprise spiking neural networks with three hidden neurons and six randomly initialized synapses in a synapse stage, connecting randomly selected communication inputs, dendrites, hidden neurons, axons and output neurons in the network. The crossover rate, which determines how often crossover occurs, can be programmed a predetermined threshold (e.g., about 0.5 in this use case). The mutation rate can also be preprogrammed to a predetermined value (e.g., it was set at 0.9). The mutations correspond to changes in the network such as adding a neuron or synapse or changing a parameter value. Rather than having a fixed number of generations, training was executed for a predetermined amount of time. The exemplary use case resulted in approximately eighty generations of evolution for each of the twenty-eight use-case runs. Over the course of training, neurons and synapses were added and removed, and parameter values are changed, customizing the network topology to the task. Based on the initial random spiking neural networks 112, very different spiking neural network 112 resulted from this evolution.

In an exemplary use case, there were six synapse units in the synapse stage. In systems there are more or fewer synapse units per synapse stage. Each synapse unit has configurable properties that are established by configuration variables and/or parameters and/or a configuration file retained in a local memory. A synapse unit may include over one thousand synapse components, a signed eight-bit weight value, a target identifier for post-synaptic processing and/or a neuron target identifier. When an incoming spike is received, the synapse unit passes a weight to a charge that is flushed to a desired dendrite through its address. The weighting and addressing occurs through weight/target lookups in a memory local to the synapse unit.

The dendrite stage is where intermediate charge values are accumulated during a single time step that are sourced by the synapses in some use cases. Within each time step, the dendrite stage receives an input charge and weight from a synapse and an input charge from the system controller stage. The dendrite stage accumulates charges into blocks of local volatile memory storage where a corresponding stored address corresponds to a target neuron identifier.

The neuron stage provides long term storage of a charge received by the dendrites and delivered to the neurons in some use cases. At every time step, charge from one of the dendrite blocks or buffers is flushed to the neuron stage. Each neuron's charge value is updated as necessary, and if the charge value exceeds a configured threshold, the neuron stage transmits a spike to the axon stage and clears and/or resets the charge value stored in the local neuron unit back to a zero. A neuron may be configured with a predetermined or eight-bit unsigned threshold, with each neuron having a predetermined charge or a sixteen-bit signed charge.

The axon stage serves to map spikes received from the neuron stage to an appropriate range of synapse units and/or output spikes through a host interface it communicates with in some use cases. All outputs of synapse units for a given neuron are allocated to a contiguous range of synapse addresses. This means the mapping of a neuron's spike to synapse units can be stored by the first index and by the total number of synapses.

In some systems, an optional control stage streams a plurality of data packets representing a plurality of charges into an output packet that is streamed to the first stage of the neuron.

Figure 9:
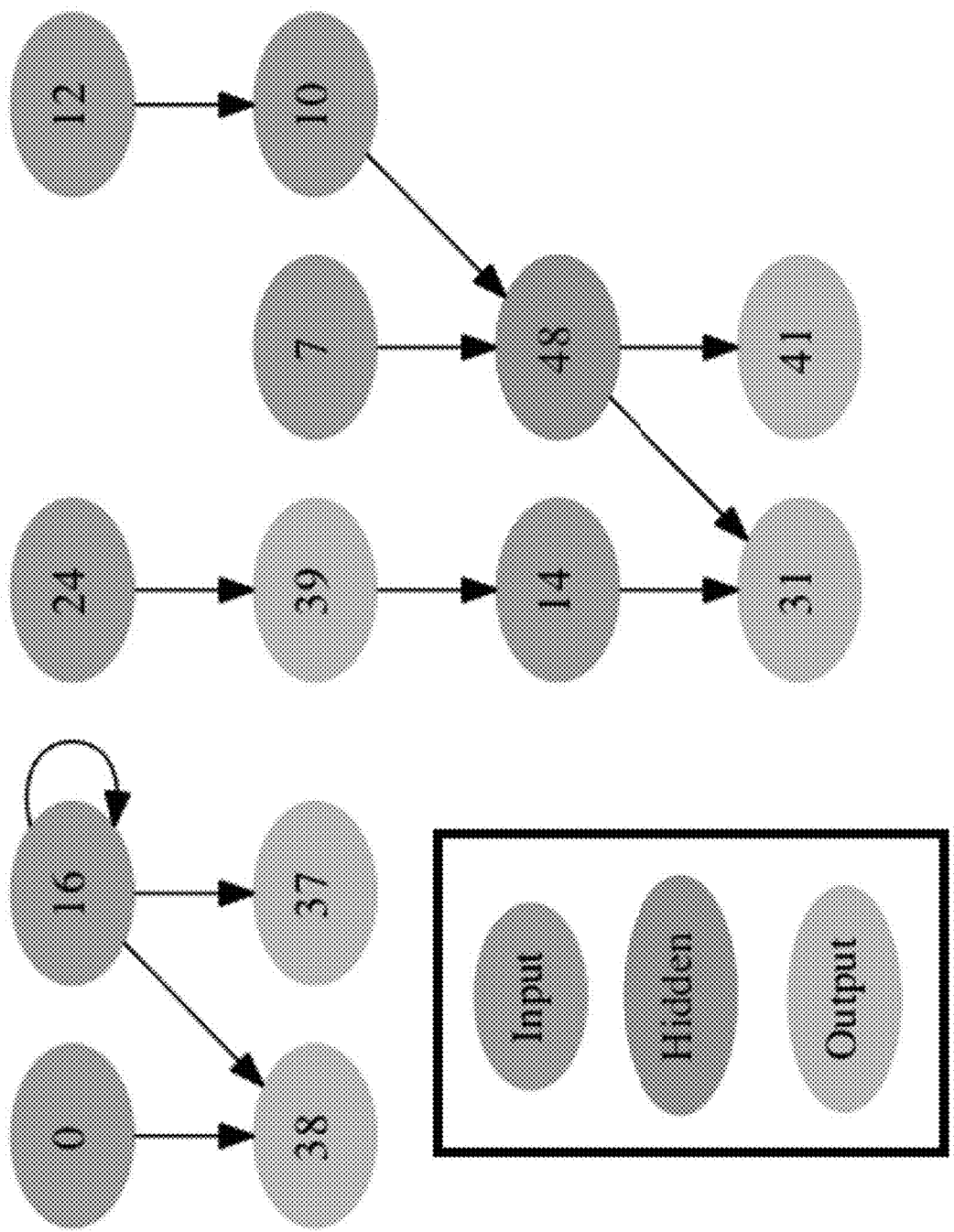
FIG. 9 is a first network graph of a spiking neural network generated by an optimizing process.
Figure 10:
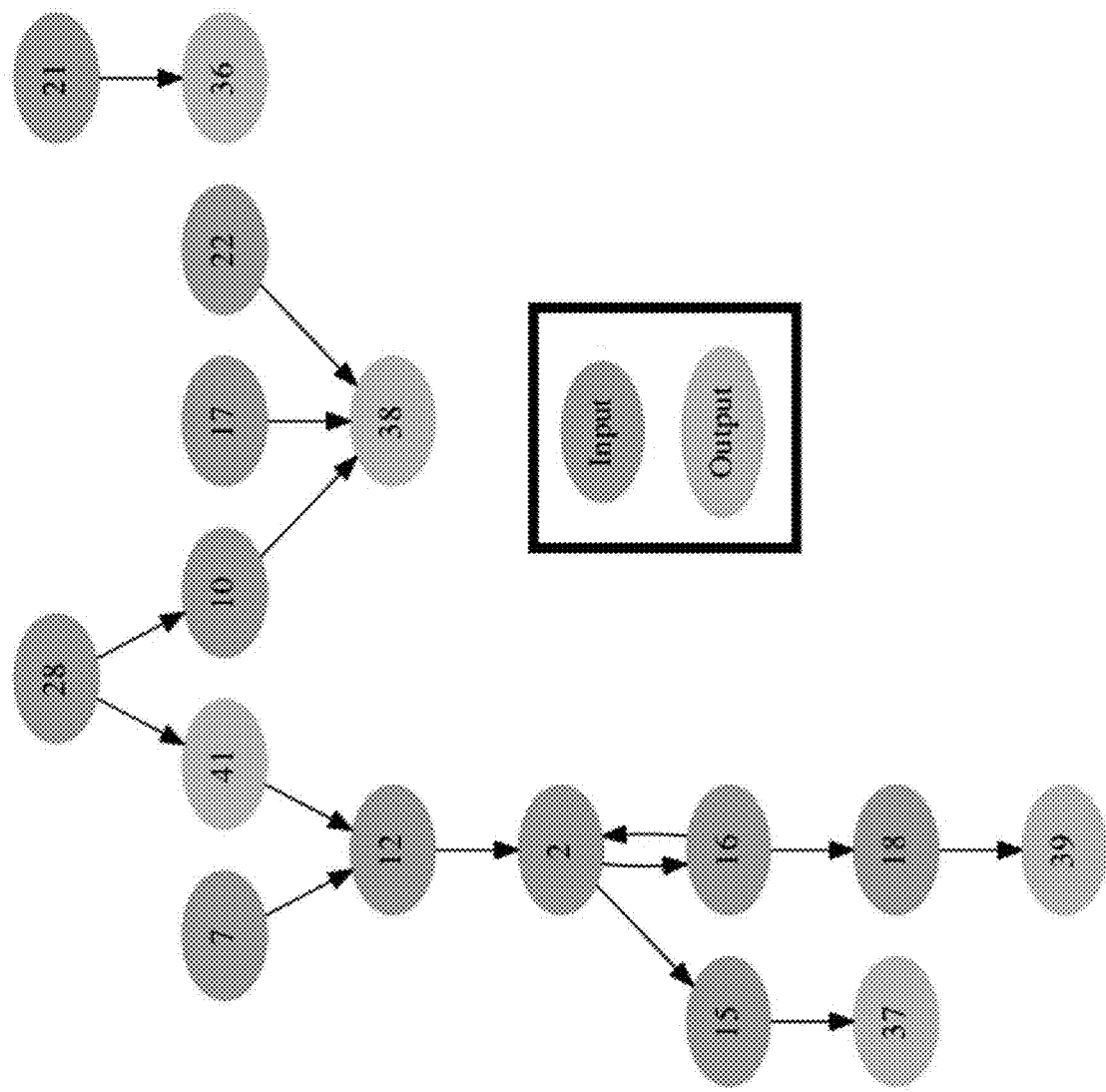
FIG. 10 is a second network graph of a spiking neural network generated by an optimizing process.
Figure 11:
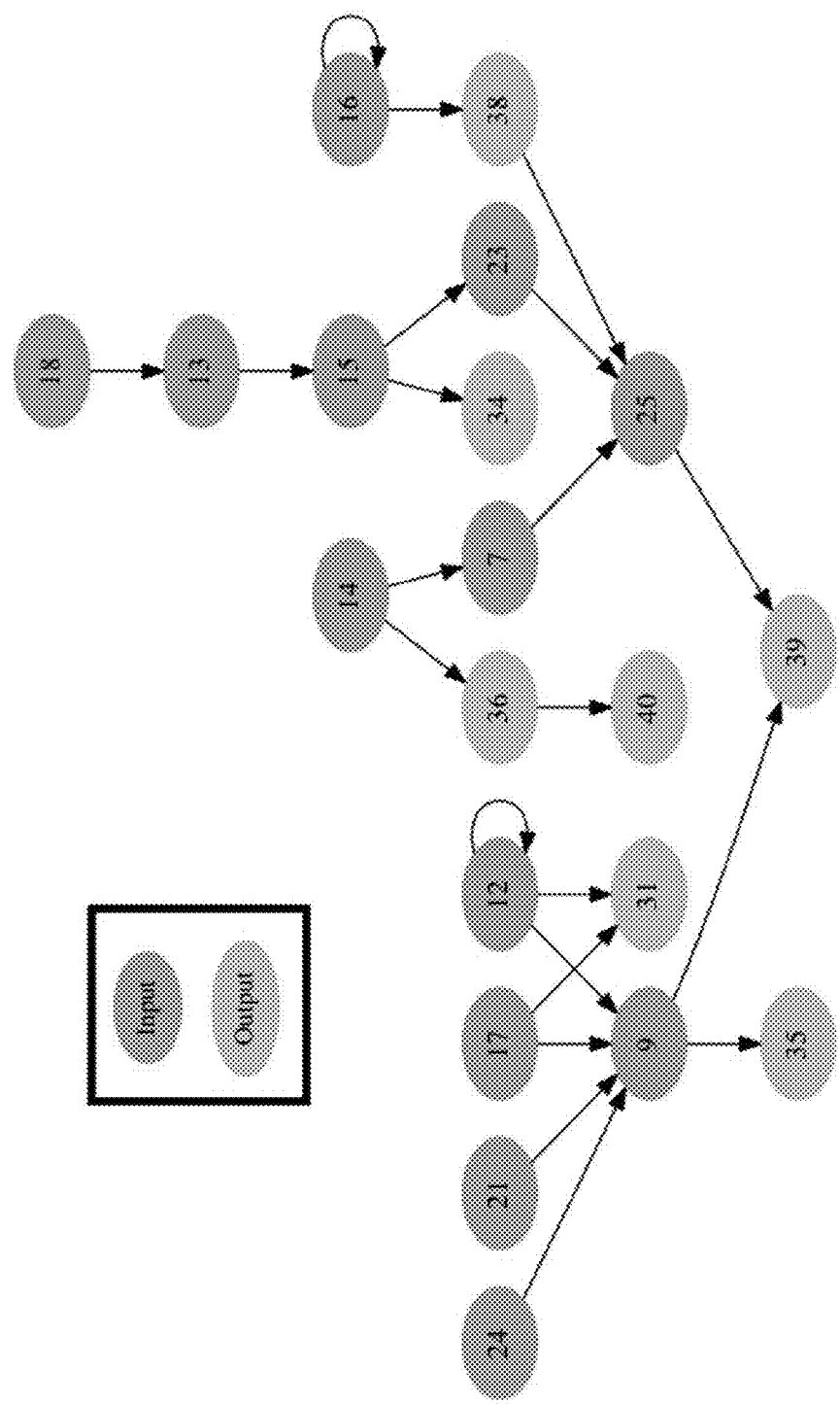
FIG. 11 is a third network graph of a spiking neural network generated by an optimizing process.

Three exemplary spiking neural networks 112 developed by the evolutionary optimization training are shown in FIGS. 9-11. The red neurons correspond to the input layer ($x_k$), the blue neurons correspond to the output layer ($u_k$), and the green neurons correspond to a hidden layer. In FIGS. 9-11, the system provides spiking activity of the neuron stage through output packets. Each neuron stage can be configured to transmit its output as required by a particular application. In this disclosure, the term "spike" refers to and represents a message transmitted from a stage. The message is comprised of a data packet with a payload and an optional header. Data packets can be transmitted from a dendrite circuit to a neuron circuit, from a neuron circuit to an axon circuit, from an axon circuit to controller circuitry, from the controller circuitry to the synapse circuitry, from the synapse circuitry to the dendrite circuit, and from the dendrite circuit to the communication circuitry, for example, and between more or fewer circuits, for example. The term "charge" refers to a discrete number. The number comprises a positive or a negative value carried in the payload of one or more data packets. The number may relate to a sensor output signal, a value, such as a voltage level, a current level, a measurement value, etc. Alternatively, the number may relate to or represent an operating state condition that determines the desired activity, etc.

One or more network graphs are then deployed or programmed into non-transitory machine-readable medium encoded with machine-executable instructions and/or a neuromorphic hardware designated to host the spiking neural network 112. An exemplary spiking neural network 112 was programmed in a field-programmable gate array (FPGA), which provides real-time control decisions at very low size, weight, and power. The FPGA was connected over a 1M Baud universal asynchronous receiver-transmitter (UART) to an ARM-based microcontroller. The microcontroller oversees receiving the engine state variables ($x_k$) through the USB in a command string and generating the necessary spiking packets to send to the FPGA. The FPGA executes the spiking neural network model and transmit spikes back to the microcontroller. The output spikes are decoded into the control commands by selecting the output neuron or output stage which spiked the most (winner takes all), and the resulting decision for the next combustion cycle was sent back to powertrain controller. Because some deployments of the spiking neural network 112 occurs through remote circuits, such as the remote FPGA, the spiking neural network 112 can communicate with any powertrain controller 110 or engine control units. The spiking neural network 112 controller is inherently flexible for real-time implementation in modern powertrain controllers 110 capable of cylinder pressure-based control. In other systems, the spiking neural network 112 is a unitary part of the powertrain controllers 110 and/or engine control units.

Figure 12:
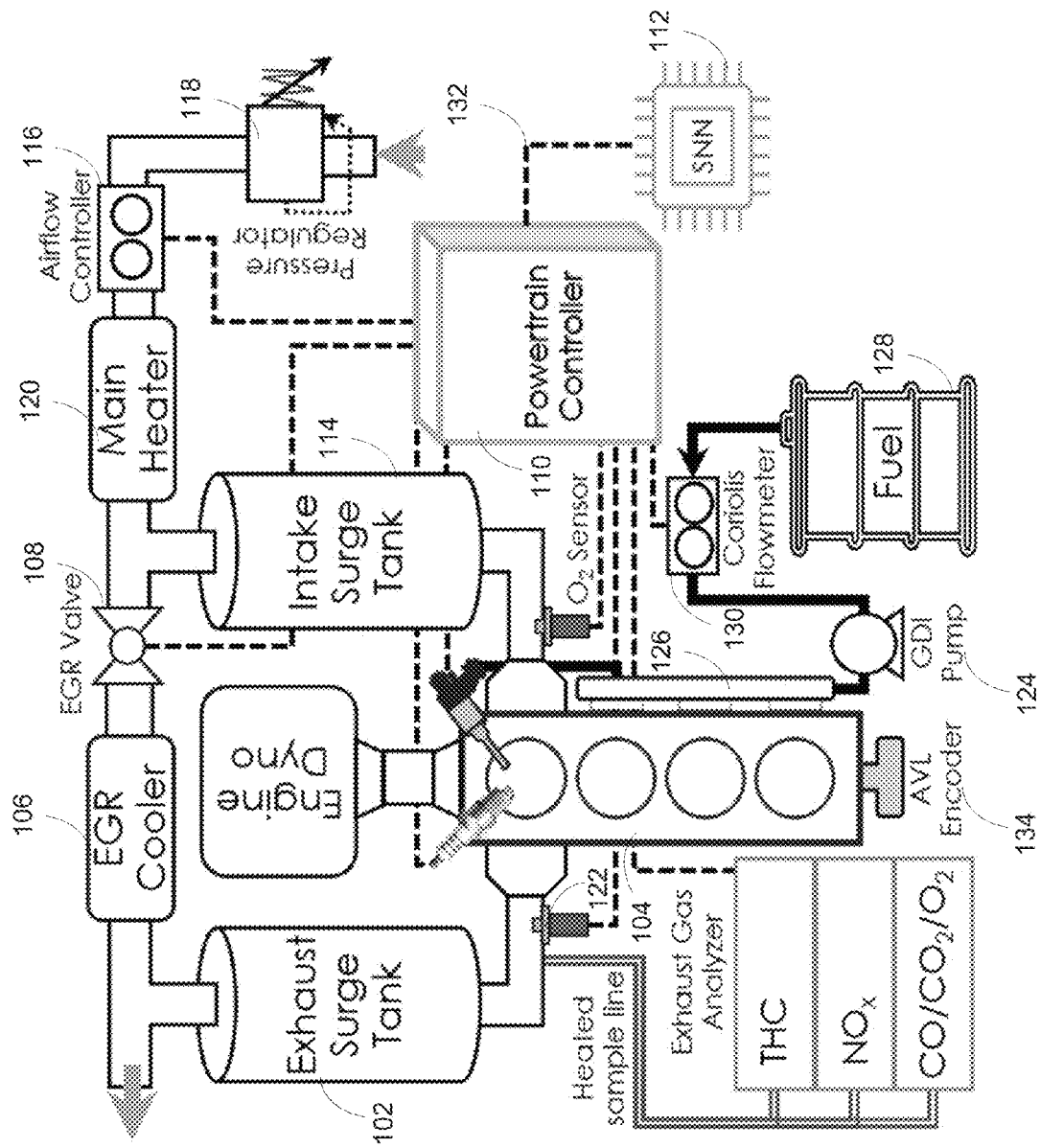
FIG. 12 is an alternative engine controller with monitoring circuitry interfacing a combustion engine in which the spiking neural network is optimized by a host computer.
Figure 13:
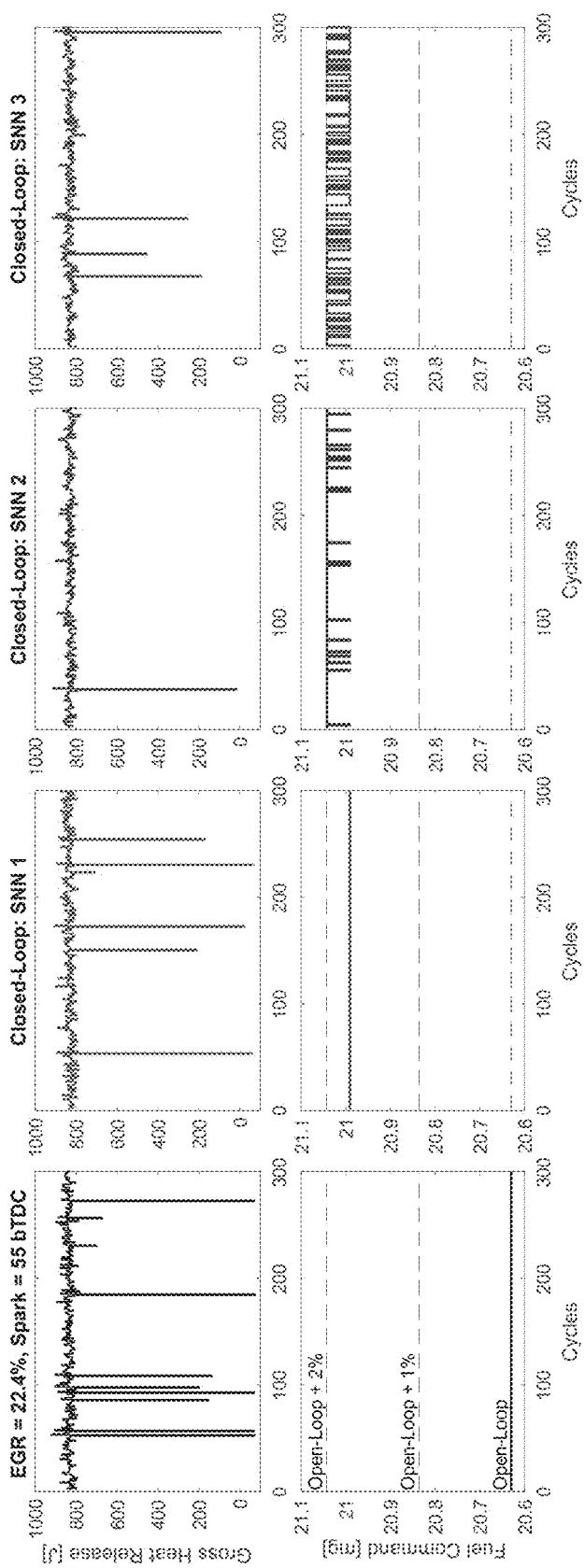
FIG. 13 shows a time series of gross heat release (top row) and fuel injection quantity (bottom row) during a three hundred cycle window of the three selected spiking neural networks compared against an open-loop control.

In another use case, the evolutionary optimization training was performed using the hybrid control-oriented combustion model calibrated for a condition like the one at twenty-two-point-four percent exhaust gas recirculation and 550 before top dead center spark advance as shown in FIG. 3. The resulting optimized networks were used for cycle-to-cycle closed-loop fuel control of the engine shown in FIG. 12 (showing an optional exhaust gas analyzer and a host computer that trains the spiking neural network 112). FIG. 13 shows the time series of the experimental gross heat release (top row) and fuel command (bottom row) for the targeted condition during open-loop and closed-loop operation. Closed loop operation refers to using the spiking neural network 112 to determine how much fuel to deliver to the combustion chamber. In open loop operation, the powertrain controller 110 ignores the signal from the spiking neural network 112 and calculates the fuel injector pulses based upon inputs from the mass air flow and manifold absolute pressure sensors. When the system enters closed-loop operation, the powertrain controller 110 modifies fuel injector pulses based upon the input from the spiking neural network 112.

The resulting spiking neural networks 112 determined that a slight fuel increase can significantly reduce the combustion cycle-to-cycle variation. This implies that the spiking neural networks 112 learned the benefits of enriching the charge without being explicitly informed. In addition, note that the spiking neural network controller does not fully utilize a fuel enrichment that could potentially yield a more stable charge. Rather, the spiking neural network controller found a balance between fuel enrichment and a cycle-to-cycle variation reduction. The spiking neural networks 112 enriched just enough to reduce the number of partial burns and misfires by half, e.g., from fifty-six in open loop to twenty-nine with the spiking neural network 112 shown in FIG. 9, to twenty-two with spiking neural network 112 shown in FIG. 10 to twenty-six with spiking neural network 112 shown in FIG. 11, without incurring a significant fuel penalty. The spiking neural network 112 of FIG. 9 achieves this by maintaining a constant command. Hence, a constant feedforward fuel command may generate similar results as the feedback controller using the spiking neural network 112 of FIG. 10. The activation observed with the controllers implanted in the spiking neural networks 112 result in a lower number of misfires and coefficient of variation overall. The feedback control law can exploit the deterministic properties of the system.

Even though the spiking neural networks 112 were trained under a single operating condition in one use case, no further calibration was performed in that use case, and the same spiking neural networks 112 were tested at all experimental conditions shown in FIG. 3 with optimal spark and exhaust gas recirculation greater than about twenty percent.

Figure 14:
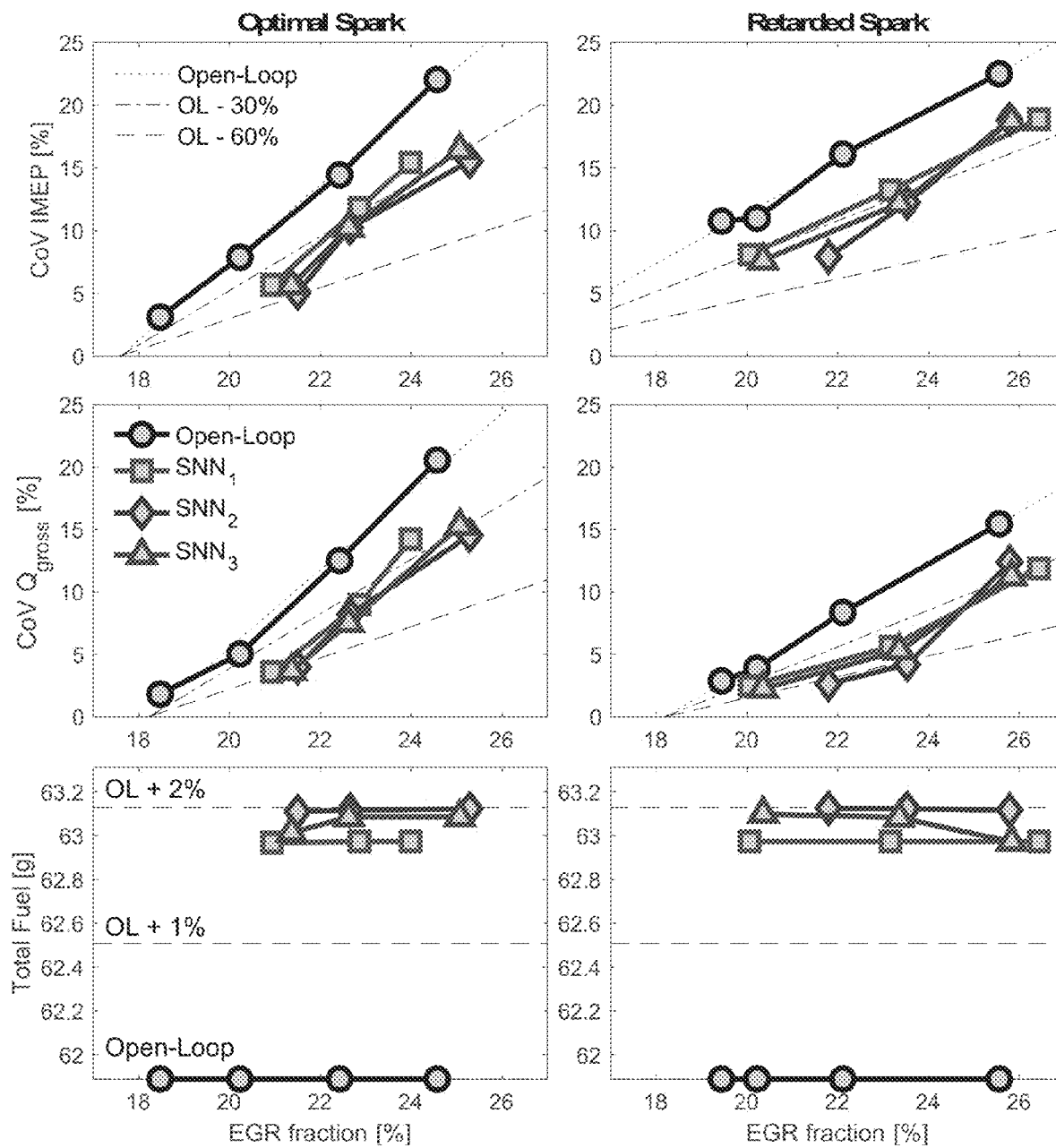
FIG. 14 shows coefficient of variation of the indicated mean effective pressure (top), coefficient of variation of gross heat release (middle), and the total fuel commands (bottom) for 3000 engine cycles at optimal spark (left) and retarded spark (right) conditions during open- and closed-loop conditions.

Each condition shown in FIG. 14 corresponds to an individual experiment of three thousand engine cycles. The top-left plot shows the coefficient of variation of indicated mean effective pressure values at different exhaust gas recirculation levels. As shown, the open-loop use cases have an almost linear increasing trend, captured by the black dotted line. The dash-dotted and dashed black lines represent linear trends with a thirty percent and a sixty percent reduction in coefficient of variation of an indicated mean effective pressure with respect to the baseline, respectively. Closed-loop experiments at different exhaust gas recirculation levels were recorded for the spiking neural network 112 of FIG. 9, the spiking neural network 112 of FIG. 10, and the spiking neural network 112 of FIG. 11. The exhaust gas recirculation levels near twenty-one percent show that the reduction in cycle-to-cycle variability gets closer to sixty percent relative to open-loop. The conditions around twenty-five percent exhaust gas recirculation show a relative reduction closer to thirty percent. The second or intermediate plot of FIG. 14 on the left column shows the reduction in coefficient of variation of $Q_{gross}$, which is the proxy variable for cycle-to-cycle variation introduced in the cost function. Similar trends are observed in other use cases, implying that indicated mean effective pressure and $Q_{gross}$ have similar cycle-to-cycle variation characteristics at optimal spark timing. The bottom-left plot of FIG. 14 shows the total fuel injected during the use case.

To test the robustness and usefulness of the spiking neural network controllers (also referred to as the spiking neural networks 112 in this disclosure) without further calibration, closed-loop experiments were performed at retarded spark conditions. Here, the cycle-to-cycle variation characteristics between advanced and retarded spark are different. The top-right and second-right plots show the coefficient of variation of the indicated mean effective pressure and the coefficient of variation of $Q_{gross}$, respectively. Note that the open-loop coefficient of variation is significantly different in absolute value between indicated mean effective pressure and $Q_{gross}$. This is a consequence of the retarded phasing causing slow but fully burned combustion events, reducing indicated mean effective pressure but not significantly changing $Q_{gross}$. For retarded spark conditions, larger relative coefficient of variation reduction is observed for $Q_{gross}$ (near 60% for EGR<24%) compared with the indicated mean effective pressure reduction (close to 30% overall).

To assess the effectiveness of the spiking neural network controllers at reducing cycle-to-cycle variation through next-cycle control action while maintaining net stoichiometric conditions, a proportional-integral controller was used to maintain $\lambda=1$ based on the exhaust oxygen sensor. The proportional-integral controller used a slow time constant to guarantee a bandwidth separation with respect to fast cycle-to-cycle spiking neural network controller, like a leader-follower decentralized control strategy. The bandwidth separation ensures that the two controllers do not interfere with each other's goals.

Figure 15:
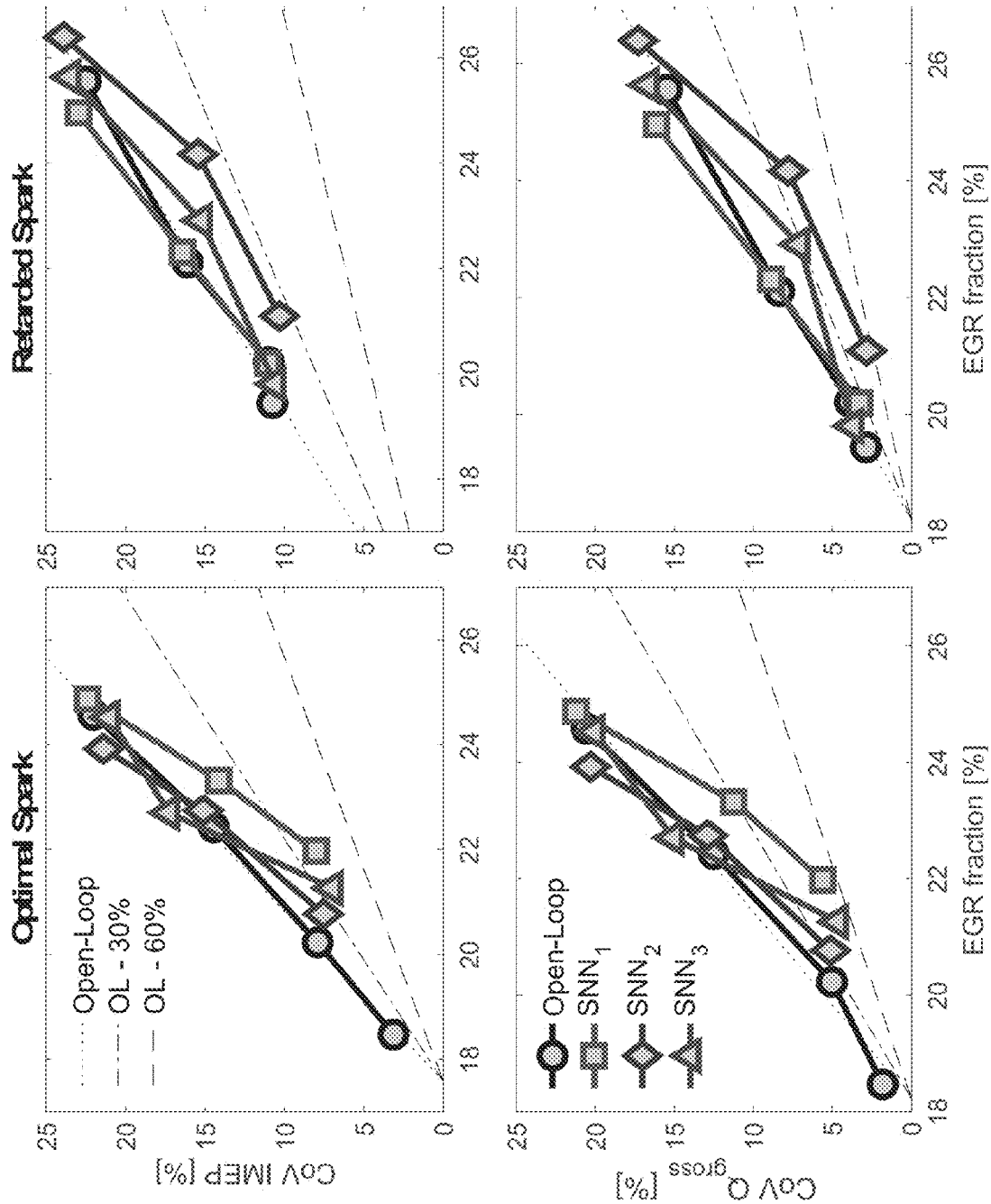
FIG. 15 shows the coefficient of variation of the indicated mean effective pressure (top) and the coefficient of variation of gross heat release (bottom) for experimental conditions using spiking neural network in closed-loop based on a cycle-to-cycle variation reduction together with fuel trim control to achieve stoichiometric combustion.

The top row of FIG. 15 shows the coefficient of variation of indicated mean effective pressure while the bottom row shows the coefficient of variation of $Q_{gross}$ for optimal (left) and retarded (right) spark conditions. Compared to FIG. 14, a more modest reduction of coefficient of variation for exhaust gas recirculation less than twenty-four percent. This use case indicates that for very high exhaust gas recirculation levels, the coefficient of variation may follow from enrichment. The results further show that there is a benefit to using the spiking neural network controllers close to the unstable limit, indicating that the systems successfully learned and utilized cycle-to-cycle combustion dynamics in addition to using enrichment.

Figure 17:
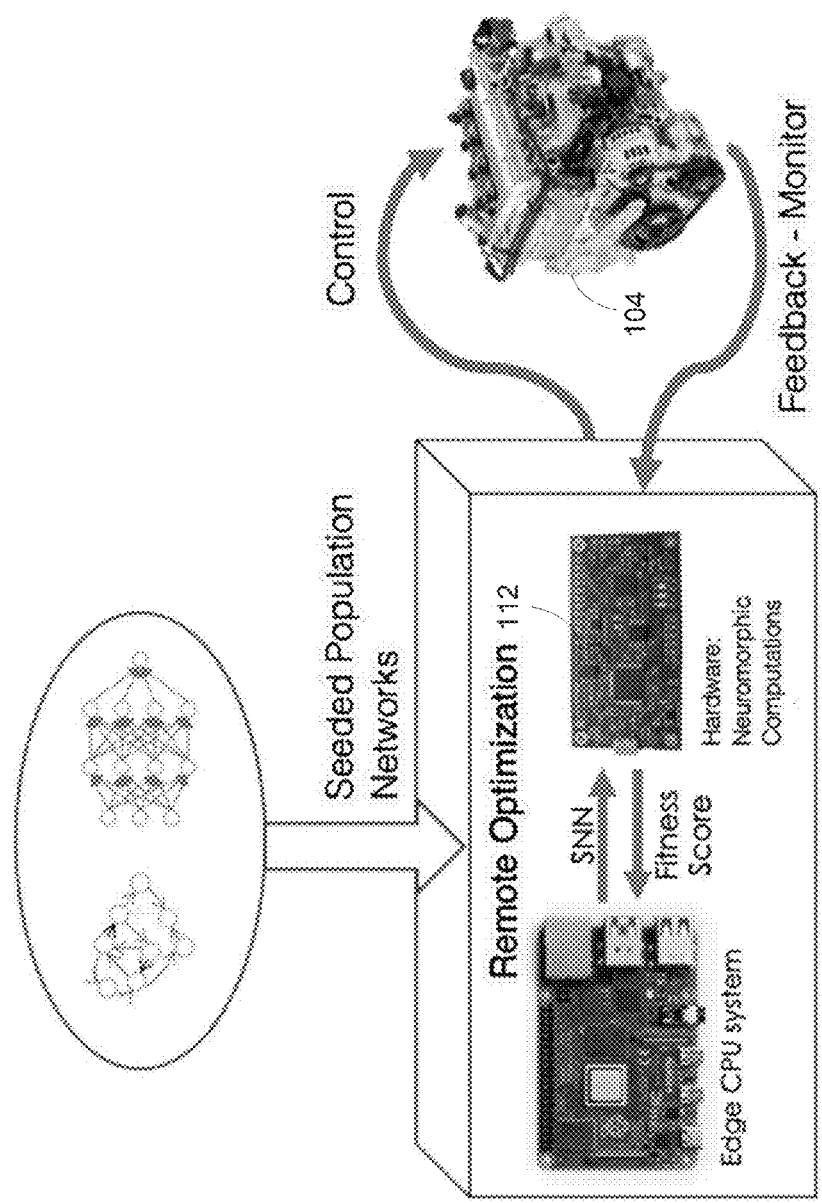
FIG. 17 shows the in-situ training of a spiking neural network for fuel quantity and/or spark control (controlling electronic spark timing, spark dwell, and/or ignition coil energy).

FIG. 17 shows the optimization of a system controlling electronic spark timing and dwell in an engine 104. The resulting edge system delivers the electronic spark timing that maintains the optimum timing and dwell delivered to a spark delivery system under all operating conditions of engine load through neuromorphic hardware 112. Using the evolutionary optimization training disclosed or an evolutionary optimization training similar to and/or based on the evolutionary optimization training described herein and shown in FIGS. 6-8, the system generated one or more network graphs that are the spiking neural networks 112 that are encoded in a non-transitory machine-readable medium encoded with machine-executable instruction. In some systems, the electronic spark timing controlled by spiking neural networks 112, that were represented by one or more network graphs, were programmed in or accessible to the neuromorphic hardware shown in FIG. 17. Fitness was measured by neuromorphic hardware and spiking neural networks 112 were adjusted on-board (e.g., in the vehicle or on the engine during operation) to the control the timing and/or dwell of the electronic spark timing systems managing the spark delivered to the compression chambers.

Figure 16:
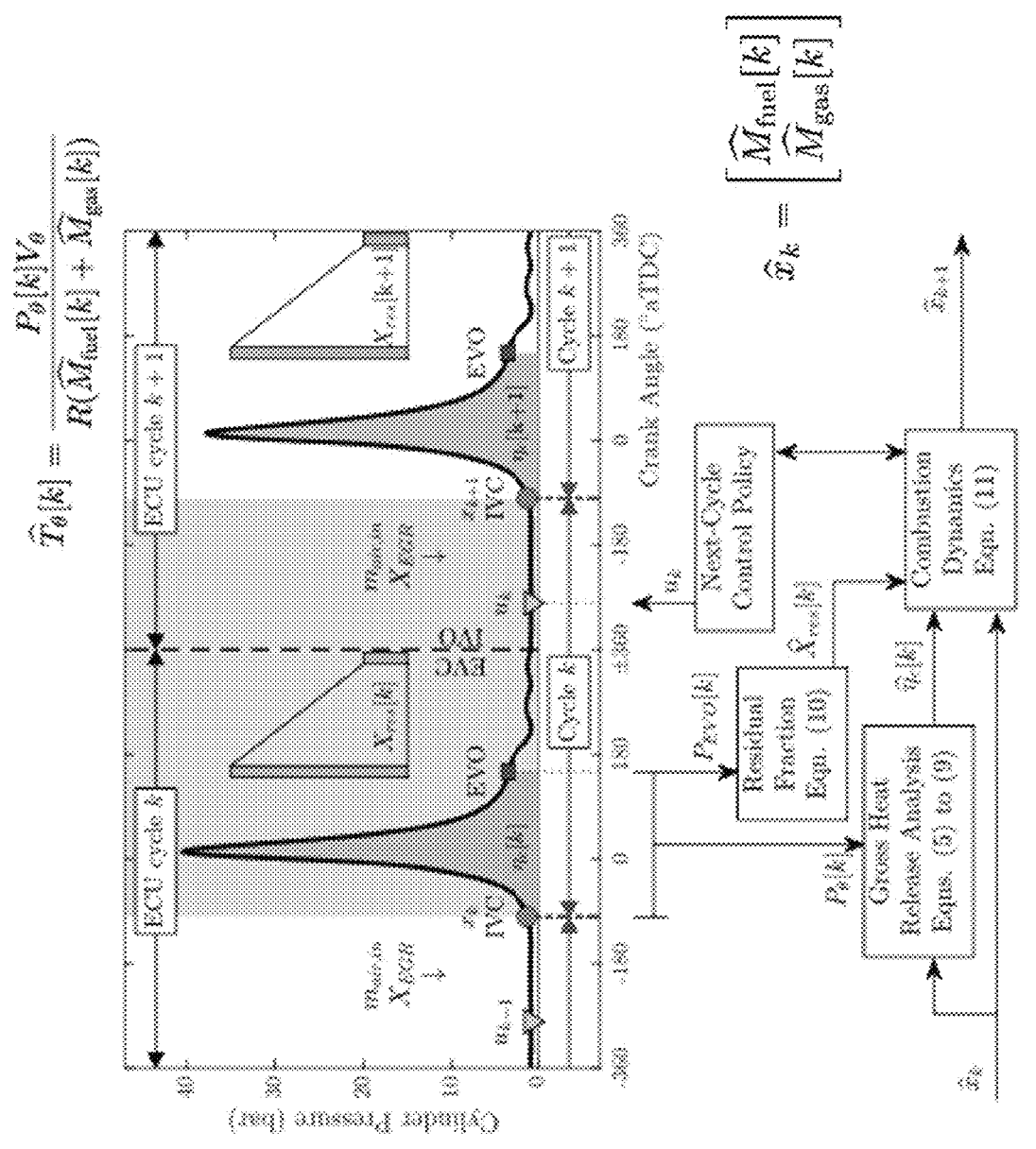
Figure 18:
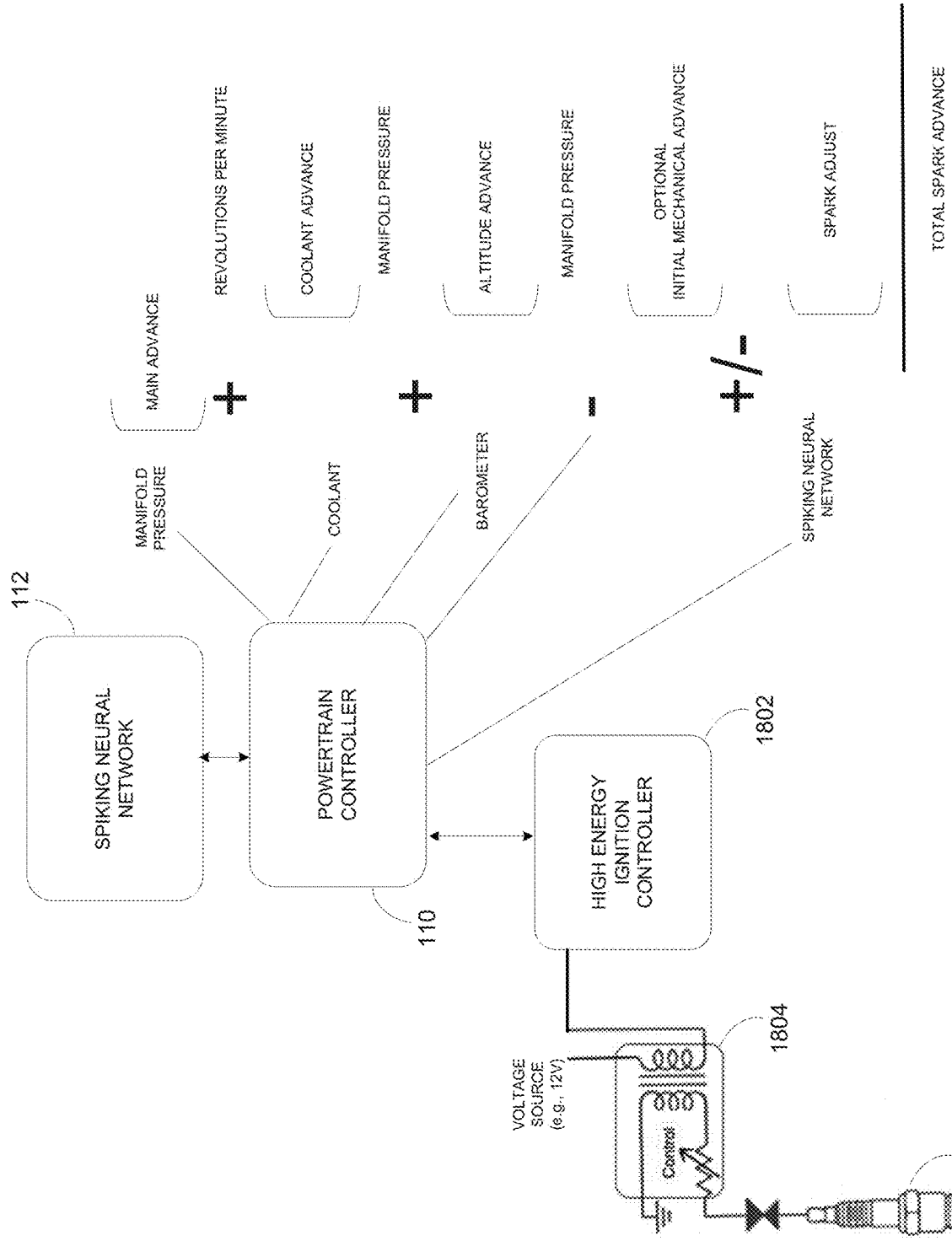
FIG. 18 shows exemplary spark timing logic.

In some systems, referring to FIGS. 16 and 18, electronic spark control is based on an initial mechanical advance associated with the engine 104, the engine's coolant temperature, the engine's revolutions-per-minute, the engine's manifold pressure, the engine's barometric pressure exceeds a barometric pressure, other states of the engine represented by $x_k$, the fuel injected represented by $u_k$, and the random variable represented by $w_k$. A high-energy ignition controller 1802 switches the pick-up coil controller 1804 on and off, adjusts the voltage level delivered to the sparkplugs (one is shown), and detects Hall effect in the pickup coil that is part of the pick-up coil controller 1804. The high-energy ignition controller 1802 converts its findings into electronic data (e.g., to switch a circuit on and off, provide a measurement and control of the varying magnetic fields, etc.) that is processed by the powertrain controller 110.

As shown in FIG. 18, the systems provide two unitary levels of control. The first level of control is a dwell control that ensures the proper or adjusted amount of energy is delivered to the spark delivery system and/or sparkplugs. The second level of control is a timing control that provides the proper timing of delivering the charge before top dead center. At top dead center the spark should be delivered to ignite the fuel in the combustion chamber for optimum performance and minimum emissions.

In some electronic spark control systems there are three modes of operation. The first mode is a bypass mode, where the spark timing and dwell are controlled by predetermined calibration values stored in a memory. This mode ensures that sparks are delivered at predetermine levels when the powertrain controls are not guaranteed. The second mode is a field service mode that occurs when a malfunction is detected causing the spark advance and dwell to operate at other calibrated operating states stored in the memory. The third mode occurs during closed-loop operation. In the third mode, the powertrain controller 110 and the spiking neural network 112 control electronic spark timing, dwell, and current profile. The powertrain controller 110 and/or the spiking neural network 112 processes the systems inputs and output the appropriate adjusted timing and deliver the appropriate dwell to the spark delivery system based on cycle-by-cycle monitoring.

In some exemplary vehicles, the powertrain controller 110 and/or the spiking neural networks 112 take control when the engine 104 is not cranking, a voltage threshold is reached, a detected revolutions-per-minute threshold is exceeded (e.g., which varies with engine types), and a diagnostic failure is not detected (e.g., diagnostic lead not grounded). When the above conditions are met, the powertrain controller 110 and/or the spiking neural network 112 retard the calibrated timing signal and/or modify dwell levels sent to the spark delivery system, until a detonation is not detected. As shown in FIG. 16, the adjusted calibrated rate and/or modified dwell level is at least partially based on the states of the system, namely $x_k=[M_{fuel}\ M_{air}\ M_{inert}]_k^T$, the injected fuel mass $u_k=m_{fuel}[k]$, and the vector of uniform random variables $w_k$, where $w_k \sim U(0,1)$.

In some systems, spark advance (timing) is calculated based on predetermined values of the engine's initial mechanical advance (optional), the engine's revolutions-per-minute versus manifold pressure, the engine's coolant temperature versus manifold pressure, and the engine's barometric and manifold pressure measurements, with the spark timing being further retarded or advanced cycle-by-cycle by the spiking neural network 112 as shown in FIG. 18. These references are generated from empirical data stored in memory. When detonation is detected (e.g., via a mechanical vibration sensitive sensor) the system may prevent or retard the signal level to a calibrated rate.

In some systems, the spiking neural network 112 may monitor the combustion chamber conditions and modify the delivered dwell levels (and/or calibration levels) to optimize spark delivery, fuel economy, reduce emissions, and increase spark delivery sustainability. Since fuel economy, emissions, and prolonging the reliability of spark delivery systems are not optimized when the electronic spark control retards spark and delivers the ignition at a maximum dwell level, the powertrain controller 110 and/or spiking neural network 112 calculates the retard rate to be removed and the dwell levels to be further reduced as quickly as possible (e.g., calibrated to the engine) to a minimum operating level to return to optimum operating conditions of spark advance with optimized combustion and extend the life of the sparkplugs 1806. The minimum operating level may be determined by empirical data calibrated to the engine under control.

Figure 19:
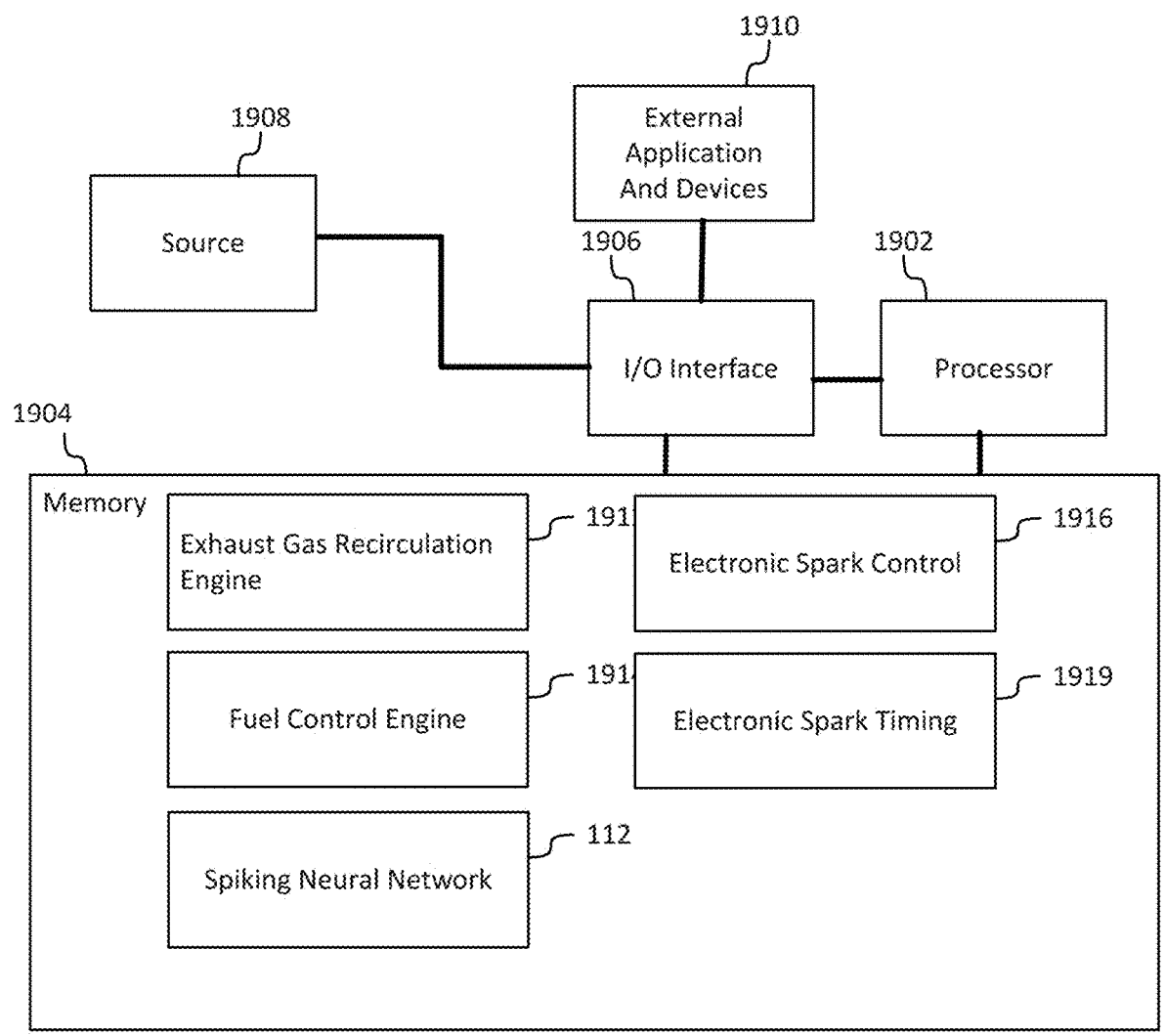
FIG. 19 shows a system providing exhaust gas recirculation control, electronic spark timing control, and fuel control.

Alternative systems are not limited to the particular hardware and algorithms described above. Alternative systems may execute the process flows, functions, and emulate the systems described herein and those shown in FIGS. 1-18 as shown in FIG. 19. The systems comprise one or more processor units 1902 or graphical processor units (not shown), a non-transitory media such as a memory 1904 (the contents of which are accessible by the one or more processors 1902 and/or graphical processors). The input and output interface 1906 connects devices and local and/or remote applications 1910 such as, for example, additional local and/or remote training sources and/or resources and other input 1908 and to external applications, devices, and one or more clouds. The memory 1904 stores instructions, which when executed by the processors 1902, causes the system to automatically render functionality that enables the management and control of exhaust gas recirculation 1912, fuel control 1914, electronic spark timing 1916, electronic spark control 1918 (e.g., includes dwell), and/or etc.

The disclosed memory 1904 and/or storage disclosed may retain an ordered listing of executable instructions for implementing the functions described above in a computer code or non-transitory machine readable medium. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), SSD, or a database management system. The memory 1904 may comprise a single device or multiple devices that may be disposed in one or more dedicated memory devices or disposed in and executed by a processor or other similar device. The term "coupled" disclosed in this description encompasses both direct and indirect coupling. The term "engine" is intended to broadly encompass an internal combustion engine 104 and/or a processor or a portion of a program stored in a memory that executes or supports events such as controlling exhaust gas recirculation and electronic spark timing. The term's use depends on the context in which the term "engine" is used. In some instances, it may be referred to as a processor engine and/or a program engine to reflect that a processor or a portion of a software program manages and manipulates data to provide the desired control. In other instances, it may refer to an internal combustion engine. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action. The term "substantially" or "about" encompasses a range that is largely, but not necessarily wholly, that which is specified. It encompasses all but a significant amount, such as within five percent. In other words, the terms "substantially" or "about" means equal to or at or within five percent of the expressed value. The term real-time refers to systems that update information at the same rate as they receive data, enabling them to direct and control a process such as an internal combustion engine. A real-time system operates at a faster rate as the physical element it is controlling.

Other suitable hardware and algorithms can be used in the disclosed systems. Furthermore, the systems are not limited to exhaust gas recirculation control, electronic spark control, electronic spark delivery control, and/or etc. Rather, the systems can also control idle speed control, air management, canister purge, torque converter clutch, and other systems that control powertrain systems. The systems illustratively disclosed herein suitably may be practiced in the absence of any disclosed or expressed element (including hardware, software, and/or functionality), and in the absence of some or all of the described functions association with a process step or component or structure that are expressly described. The systems may operate in the absence of one or more of these process steps, elements and/or any subset of the expressed functions. Further, the various elements and system components, and process steps described in each of the many systems described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of) including those disclosed in the prior art but not expressed in the disclosure herein. Thus, some systems do not include those disclosed in the prior art and thus may be described and claim the absence of such elements.

The results show that the disclosed systems quickly learn and reduce cycle-to-cycle variation reductions. The systems improve fuel economy, and in some systems reduce emission levels. The disclosed systems monitor, control, and/or adjust the combustion systems that manage an internal combustion engine. The systems are reliable, small, and perform several on-engine and/or on-car functions and some systems operate in real-time. These include sending commands to control fuel/exhaust mixtures, spark timing, spark dwell, etc.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

The invention claimed is:

1. A non-transitory machine-readable medium encoded with machine-executable instructions, wherein execution of the machine-executable instructions is for:

storing a plurality of network vectors that represent a plurality of diverse and distinct spiking neural networks in a memory;

decoding the plurality of network vectors received from the memory;

training a plurality of constructed spiking neural networks using a training dataset;

evaluating the plurality of constructed spiking neural networks using an evaluation data set;

rendering a plurality of fitness values associated with the plurality of constructed spiking neural networks;

duplicating a selected plurality of network vectors to generate a plurality of duplicated network vectors;

crossing-over the plurality of duplicated network vectors that represent modified spiking neural networks by automatically exchanging vector segments between the plurality of duplicated network vectors to generate a plurality of crossing-over duplicated network vectors;

mutating the crossing-over duplicated network vectors by randomly modifying one or more portions of the crossing-over duplicated network vectors to generate a trained spiking neural network;

metering an exhaust gas and/or excess air into an intake manifold when an engine temperature exceeds a first temperature threshold, an engine load exceeds a first predetermined mass airflow pressure threshold, an engine's rotation-per-minute rate exceeds a first rotation-per-minute rate threshold, and a fuel flow exceeds a first predetermined fuel threshold; and modifying the fuel flow into an engine's combustion chamber on a cycle-to-cycle basis by the trained spiking neural network.

2. The non-transitory machine-readable medium of claim 1, where the machine-executable instructions used to generate trained spiking neural network are executed repeatedly until a predetermined number of trained spiking neural networks are generated.

3. The non-transitory machine-readable medium of claim 1, where the engine's rotation-per-minute rate is measured by an engine speed sensor of a vehicle.

4. The non-transitory machine-readable medium of claim 1, where the engine temperature is measured by a coolant temperature of a vehicle.

5. The non-transitory machine-readable medium of claim 1, stopping the metering an exhaust gas into the intake manifold and modifying the fuel flow into the engine's combustion chamber on the cycle-to-cycle basis when a torque converter clutch is engaged on a vehicle.

6. The non-transitory machine-readable medium of claim 1, where a cycle comprises four-distinct piston strokes of an internal combustion engine comprising an intake mode, a compression mode, a power delivery mode, and an exhaust mode in which a piston makes two complete passes in a cylinder.

7. The non-transitory machine-readable medium of claim 1, where the modifying the fuel flow into an engine's combustion chamber on a cycle-to-cycle basis is based on an immediate prior operating state of an engine, an immediate prior level of fuel injected into the combustion chamber of the engine, and a random variable associated with the engine.

8. The non-transitory machine-readable medium of claim 7, where an electronic spark timing of an engine is based on an initial mechanical advance, the engine's temperature, the engine's mass airflow pressure, the engine's rotation-per-minute, a barometric pressure of the engine, and an output of the trained spiking neural network.

9. The non-transitory machine-readable medium of claim 8, where the electronic spark timing of the engine is retarded or advanced by the spiking neural network.

10. The non-transitory machine-readable medium of claim 9, where a dwell of a signal delivered to a spark delivery system is modified by the spiking neural network.

11. The non-transitory machine-readable medium of claim 9, further comprising selecting a voltage and/or current profile with a desired spark energy level for an ignition system through the spiking neural network.

12. A process for controlling a combustion engine, comprising:

storing a plurality of network vectors in a memory that represent a plurality of diverse and distinct spiking neural networks;

decoding the plurality of network vectors received from the memory;

training a plurality of constructed spiking neural networks using a training dataset;

evaluating the plurality of constructed spiking neural networks using an evaluation data set;

rendering a plurality of fitness values associated with the plurality of constructed spiking neural networks;

duplicating a selected plurality of network vectors based on at least one of the plurality of fitness values to generate a plurality of duplicated network vectors;

crossing-over the plurality of duplicated network vectors that represent modified spiking neural networks by automatically exchanging vector segments between the plurality of duplicated network vectors to generate a plurality of crossing-over duplicated network vectors;

mutating the crossing-over duplicated network vectors by randomly modifying one or more portions of the crossing-over duplicated network vectors to generate a trained spiking neural network;

metering an exhaust gas and/or excess air into an intake manifold when an engine temperature exceeds a first temperature threshold, an engine load exceeds a first predetermined mass airflow pressure threshold, an engine's rotation-per-minute rate exceeds a first rotation-per-minute rate threshold, and a fuel flow exceeds a first predetermined fuel threshold; and modifying the fuel flow into an engine's combustion chamber on a cycle-to-cycle basis by the trained spiking neural network.

13. The process of claim 12, where the trained spiking neural network are executed repeatedly until a predetermined number of trained spiking neural networks are generated.

14. The process of claim 12, where the engine's rotation-per-minute rate are measured by an engine speed sensor of a vehicle.

15. The process of claim 12, where the engine temperature is measured by a coolant temperature of a vehicle.

16. The process of claim 12, stopping the metering an exhaust gas into the intake manifold and modifying the fuel flow into the engine's combustion chamber on the cycle-to-cycle basis when a torque converter clutch is engaged on a vehicle.

17. The process of claim 12, where a cycle comprises four-distinct piston strokes of an engine comprising an intake mode, a compression mode, a power delivery mode and an exhaust mode in which a piston makes two complete passes in a cylinder.

18. The process of claim 12, where the modifying the fuel flow into an engine's combustion chamber on a cycle-to-cycle basis is based on an immediate prior operating state of an engine, an immediate prior level of fuel injected into the combustion chamber and a random variable of the engine.

19. The process of claim 18, where an electronic spark timing of an engine is based on the engine's temperature, the engine's mass airflow pressure, the engine's rotation-per-minute, a barometric pressure of the engine, and the trained spiking neural network that advances and retards the electronic spark timing of the engine.

\* \* \* \* \*